(12) United States Patent
Nishikawa et al.

(10) Patent No.: US 7,950,230 B2
(45) Date of Patent: May 31, 2011

(54) WASTE HEAT RECOVERY APPARATUS

(75) Inventors: Michio Nishikawa, Obu (JP); Kouji Yamashita, Okazaki (JP); Hiroshi Kishita, Anjo (JP); Keiichi Uno, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 457 days.

(21) Appl. No.: 12/232,010

(22) Filed: Sep. 9, 2008

(65) Prior Publication Data

US 2009/0071156 A1 Mar. 19, 2009

(30) Foreign Application Priority Data

Sep. 14, 2007 (JP) ................................ 2007-239962
Oct. 15, 2007 (JP) ................................ 2007-268329

(51) Int. Cl.
*F01K 23/10* (2006.01)
(52) U.S. Cl. ......................................... 60/618; 60/660
(58) Field of Classification Search .................. 60/616, 60/618, 660–667
See application file for complete search history.

(56) References Cited

U.S. PATENT DOCUMENTS

| | | | |
|---|---|---|---|
| 6,647,727 B2 * | 11/2003 | Klatt et al. .................... | 60/653 |
| 7,159,400 B2 * | 1/2007 | Tsutsui et al. .................. | 60/665 |
| 7,200,996 B2 * | 4/2007 | Cogswell et al. .............. | 60/651 |
| 7,454,912 B2 * | 11/2008 | Yamanaka et al. ............. | 60/618 |
| 2003/0213246 A1 * | 11/2003 | Coll et al. ...................... | 60/653 |
| 2006/0086091 A1 | 4/2006 | Sato et al. | |
| 2006/0101821 A1 | 5/2006 | Sato et al. | |

FOREIGN PATENT DOCUMENTS

JP U-59-146504 9/1984
JP A-2004-108220 4/2004

* cited by examiner

*Primary Examiner* — Hoang M Nguyen
(74) *Attorney, Agent, or Firm* — Posz Law Group, PLC

(57) ABSTRACT

A waste heat recovery apparatus including a Rankine cycle which includes a heater for heating an operation fluid by waste heat from a heat-generating device, an expansion unit for converting energy of expansion of the operation fluid flowing out from the heater into mechanical energy, and a condenser for condensing and liquefying the expanded operation fluid, a temperature detector for detecting the temperature of the operation fluid on the inlet side of the expansion unit, a pressure detector for detecting inlet-side pressure of the expansion unit, a pressure detector for detecting outlet-side pressure of the expansion unit, and a control unit. The control unit controls a command rotational speed of the expansion unit based on superheated degree information at the inlet of the expansion unit obtained from the operation fluid temperature and the inlet-side pressure, and pressure information in which the outlet-side pressure is considered.

21 Claims, 19 Drawing Sheets

(S5 RANKINE STOP CONTROL)

(S6 RANKINE STOP DETERMINATION CONTROL)

FIG. 13
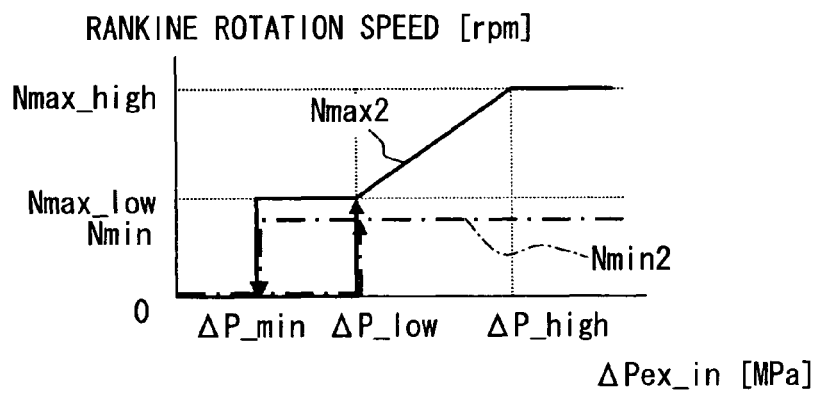
FIG. 14
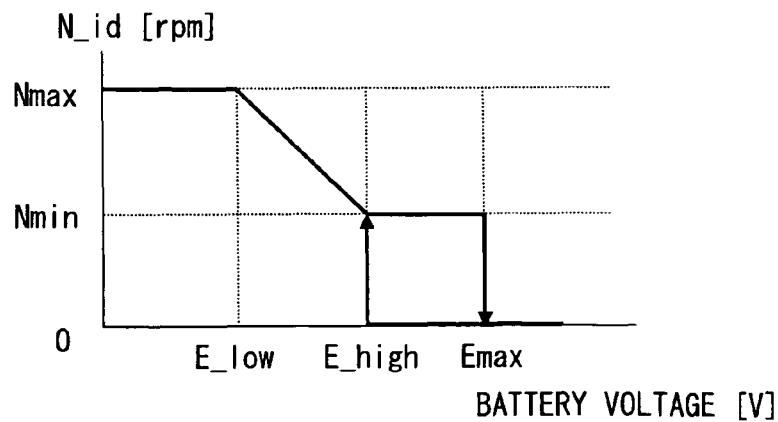
FIG. 15

WASTE HEAT RECOVERY APPARATUS

CROSS REFERENCE TO RELATED APPLICATION

This application is based on Japanese Patent Applications No. 2007-239962 filed on Sep. 14, 2007 and No. 2007-268329 filed on Oct. 15, 2007, the disclosure of which is incorporated herein by reference.

FIELD OF THE INVENTION

The present invention relates to a waste heat recovery apparatus for recovering the power by utilizing waste heat from a heat-generating device such as an internal combustion engine of a vehicle.

BACKGROUND OF THE INVENTION

A waste heat recovery apparatus has heretofore been known for recovering the power by utilizing the waste heat from an internal combustion engine. The waste heat recovery apparatus has a Rankine cycle including a heater for heating an operation fluid by using the waste heat from an internal combustion engine, an expansion unit (turbine) for producing a rotational driving force by expanding the heated operation fluid, and a condenser for condensing the expanded operation fluid.

According to a Rankine cycle disclosed in, for example, JP-A-2004-60462, the rotational speed of the expansion unit is controlled so as to bring the pressure of refrigerant on a high-pressure side (pressure on the inlet side) flowing into the expansion unit into agreement with a target pressure.

Taking the pressure of the high-pressure side of the expansion unit into consideration is effective in suppressing the refrigerant flowing into the expansion unit from being transformed into gas/liquid two phases and in maintaining a suitable viscosity (suitable degree of oil film thickness) of a lubricating oil necessary for devices (e.g., sliding portion of the expansion unit) constituting the Rankine cycle. However, if the pressure of the refrigerant on a low-pressure side (pressure on the outlet side) flowing out from the expansion unit is too high, it is difficult to sufficiently maintain the pressure differential between the high-pressure side and the low-pressure side, and thus over-expansion may take place. That is, if the expansion unit is not operated so as to properly expand the refrigerant, it becomes difficult to stably and efficiently operate the Rankine cycle.

According to a Rankine cycle disclosed in JP-A-2004-108220, a pump and a generator are coupled to a main shaft of an expansion unit as a unitary structure.

A liquid or a gas (exhaust gas from a gas expansion unit or an engine) is fed to the heater for heating. The operation fluid sent from a pump is transformed into superheated vapor through the heater and is then introduced into the expansion unit. In the expansion unit, the operation fluid is adiabatically expanded, and thus the driving force is generated. The driving force operates the pump and the generator that are coupled to the expansion unit are driven by the driving force, and thus the operation of the Rankine cycle is continued, and heat energy of the exhaust gas is stored as electric energy. The operation fluid after having expanded is cooled and condensed by cooling air and the like in the condenser, and is then sucked by the pump.

At the start of the Rankine cycle, if the operation fluid flows into the expansion unit from the heat exchanger for heating, a sharp pressure differential is generated between the inlet and the outlet of the expansion unit. With this, a large force is exerted on the sliding portions of the expansion unit, and may adversely affect the durability. As such, it is difficult to stably start the Rankine cycle.

SUMMARY OF THE INVENTION

In view of the above problems, it is a first object of the present invention to provide a waste heat recovery apparatus capable of stably and efficiently recovering power by utilizing waste heat from a heat-generating device. A second object of the present invention is to provide a waste heat recovery apparatus having a Rankine cycle in which a pump, an expansion unit and a generator are directly coupled together and which can start an operation stably.

According to a first aspect of the present invention, a waste heat recovery apparatus which utilizes waste heat from a heat generating device includes a Rankine cycle, a temperature detector, an inlet-side pressure detector, an outlet-side pressure detector, and a control unit. The Rankine cycle includes a pump for circulating an operation fluid, a heater for heating the operation fluid by the waste heat, an expansion unit for converting energy of expansion of the heated operation fluid into mechanical energy, and a condenser for condensing and liquefying the expanded operation fluid. The temperature detector detects a temperature of the operation fluid flowing into the expansion unit. The inlet-side pressure detector detects inlet-side pressure on an inlet side of the expansion unit. The outlet-side pressure detector detects outlet-side pressure on an outlet side of the expansion unit.

The control unit controls a command rotational speed of the expansion unit based on superheated degree information of the inlet side of the expansion unit and pressure information, the superheated degree information being obtained from the temperature of the operation fluid detected by the temperature detector and the inlet-side pressure detected by the inlet-side pressure detector, and the pressure information being obtained by considering the outlet-side pressure detected by the outlet-side pressure detector.

According to the above constitution, since the information related to the degree of superheating is taken into consideration, the lubricating oil, which is necessary for the devices (e.g., sliding portions of the expansion unit) constituting the Rankine cycle, can be maintained in a proper viscosity. Also, by taking the information related to the pressure inclusive of the outlet-side pressure into consideration, a sufficient pressure differential between the inlet-side pressure of the expansion unit, which is on the high-pressure side and the outlet-side pressure of the expansion unit, can be sufficiently maintained, and therefore, over-expansion in the expansion unit will be reduced. That is, the expansion unit can be properly operated by taking a high-pressure-side condition (superheated degree information) and a low-pressure-side condition (pressure information) into consideration, and hence the Rankine cycle is stably and efficiently operated.

According to a second aspect of the present invention, a waste heat recovery apparatus includes a Rankine cycle, a rotary electric machine, a control unit, a bypass passage, an opening/closing part, a temperature detector, and pressure differential detecting means. The Rankine cycle includes a pump for pressure-feeding a liquid phase operation fluid, a heater for transforming the liquid phase operation fluid fed from the pump into a gaseous phase operation fluid by heating with waste heat from a heat-generating device, an expansion unit for converting energy of expansion of the gaseous phase operation fluid flowing out from the heater into mechanical energy, and a condenser for condensing and liquefying the expanded gaseous phase operation fluid flowing out from the expansion unit and introducing the liquefied operation fluid into the pump. The rotary electric machine has both functions of an electric motor and a generator, and is connected to the pump and the expansion unit through the same shaft. The control unit controls the operation of the rotary electric machine. The bypass passage bypasses the expansion unit. The opening/closing part is controlled by the control unit to open and close the bypass passage. The temperature detector detects a temperature of the gaseous phase operation fluid on an inlet side of the expansion unit. The pressure differential detecting means detects a pressure differential between the inlet side and an outlet side of the expansion unit.

At the start of the Rankine cycle, the control unit controls the opening/closing part to open the bypass passage and controls the rotary electric machine to operate as the electric motor at a predetermined rotational speed. Further, if the temperature of the gaseous phase operation fluid detected by the temperature detector becomes equal to or higher than a predetermined temperature, the control unit controls the opening/closing part to close the bypass passage, and controls the rotary electric machine such that an operation rotational speed of the rotary electric machine increases relative to the predetermined rotational speed until a pressure differential detected by the pressure differential detector means reaches a predetermined pressure differential.

Therefore, the opening/closing part is opened first, and the rotary electric machine is operated as the electric motor at the predetermined rotational speed to thereby operate the pump and the expansion unit. The operation fluid flows chiefly through a bypass passage while also flowing in the expansion unit. Therefore, the operation fluid circulates in the Rankine cycle without generating a pressure differential between the inlet and the outlet of the expansion unit.

The operation fluid assumes a sufficiently superheated condition if its temperature on the inlet side of the expansion unit becomes higher than a predetermined temperature, and it can be confirmed that the expansion unit is placed in a condition in which it can be driven by the expansion of the operation fluid.

In this stage, the opening/closing part is closed so that the operation fluid flows to the expansion unit from the bypass passage and that the expansion unit is operated by the expansion of the operation fluid.

In this case, although a pressure differential occurs between the inlet and the outlet of the expansion unit, the operation rotational speed of the rotary electric machine is increased relative to the predetermined rotational speed in accordance with the pressure differential. With this, an operation rotational speed of the expansion unit is increased, and a discharge capability of the expansion unit is gradually increased. Accordingly, it is possible to relax the rising characteristics of the pressure differential (rate of increase of the pressure differential relative to the time)

Therefore, the occurrence of sharp pressure differential is suppressed in the expansion unit, and the Rankine cycle can be stably started.

BRIEF DESCRIPTION OF THE DRAWINGS

Other objects, features and advantages of the present invention will become more apparent from the following detailed description made with reference to the accompanying drawings, in which like parts are designated by like reference numerals and in which:

FIG. 13 is a diagram illustrating an increase and a decrease in a maximum rotational speed of the expansion unit based upon a superheated degree and a pressure ratio according to the second embodiment;

FIG. 14 is a diagram of characteristics illustrating a relationship between the low-pressure side condition and the rotational speed (maximum rotational speed, minimum rotational speed) of the expansion unit according to a modified example of the first embodiment;

FIG. 15 is a diagram of characteristics illustrating a relationship between the battery voltage and the command rotational speed in another modified example of the first and second embodiments;

DETAILED DESCRIPTION OF EXEMPLARY EMBODIMENT

First Embodiment

A first embodiment of the present invention will now be described with reference to FIGS. 1 to 11.

Figure 1:
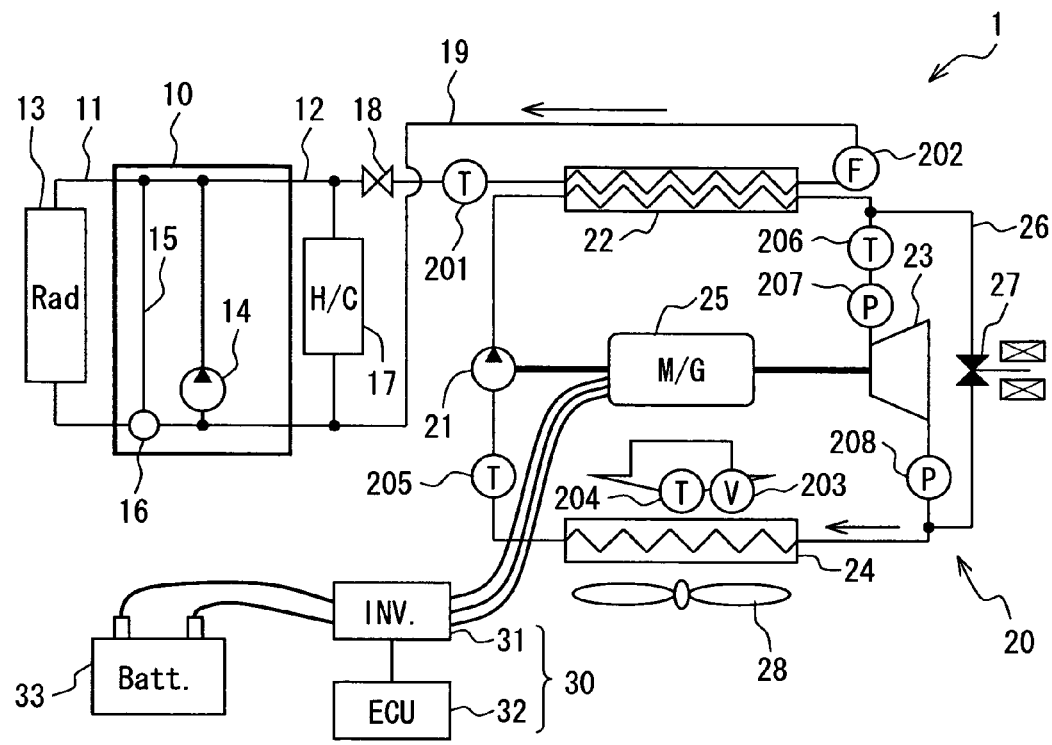
FIG. 1 is a diagram schematically illustrating the whole system of a waste heat recovery apparatus having a Rankine cycle according to a first embodiment of the present invention.

FIG. 1 is a diagram schematically illustrating the whole system of a waste heat recovery apparatus 1 having a Rankine cycle 20. As shown in FIG. 1, the waste heat recovery apparatus 1 of the present embodiment is applied, for example, to a vehicle that uses an engine 10 as a driving source.

The engine 10 is a water-cooled internal combustion engine. The engine 10 is provided with a radiator circuit 11 for cooling the engine 10 by circulating the engine-cooling water, and a heater circuit 12 for heating air to be conditioned by using the cooling water (hot water) as a source of heat.

A radiator 13 is provided in the radiator circuit 11. The radiator 13 cools the cooling water circulated by a hot water pump 14 by exchanging heat with an external air. The hot water pump 14 may be either an electric pump or a mechanical pump. A heater 22 of the Ranking cycle 20, which will be described later, is arranged in the flow passage on the outlet side of the engine 10, and the cooling water flows through the heater 22.

A radiator bypass passage 15 is provided in the radiator circuit 11 to flow the cooling water while bypassing the radiator 13. Further, the radiator circuit 11 is provided with a thermostat 16 which adjusts the amount of the cooling water flowing through the radiator 13 and the amount of the cooling water flowing through the radiator bypass passage 15.

The heater circuit 12 is provided with a heater core 17 through which the cooling water (hot water) circulates by means of the hot water pump 14. The heater core 17 is arranged in an air conditioner casing (not shown) of an air-conditioning unit and heats the to-be-conditioned air blown by a blower (not shown) by exchanging the heat with the hot water. An air-mixing door (not shown) is provided in the air conditioner casing, and the amount of the to-be-conditioned air flowing through the heater core 17 is varied by opening and closing the air-mixing door.

The heater circuit 12 includes a heater passage 19 for bypassing the heater core 17. The heater 22 of the Rankine cycle 20 is disposed in the heater passage 19, so that the cooling water flows through the heater 22. A shut valve 18 is provided on the upstream of the heater 22. Upon opening and closing the shut valve 18, the cooling water is suitably adjusted so as to flow or not to flow toward the heater 22.

The Rankine cycle 20 recovers waste heat energy (heat of the cooling water) generated by the engine 10, and converts the waste heat energy into mechanical energy (a driving force of an expansion unit 23, which will be described later) and further into electric energy (the amount of power generation of a generator 25, which will be described later) to utilize it. The Rankine cycle 20 will now be described.

The Rankin cycle 20 includes a pump 21, the heater 22, the expansion unit 23 and a condenser 24, and which are connected in the form of loop to form a closed circuit. Further, a bypass passage 26 is provided between the heater 22 and the condenser 24 to bypass the expansion unit 23. The bypass passage 26 is provided with a bypass valve (opening/closing part) 27. The bypass valve 27 is, for example, an electromagnetic valve, and an opening/closing operation of a valve body thereof is controlled by a current control circuit 30, which will be described later.

The pump 21 is an electric pump for circulating the refrigerant (operation fluid, hereinafter referred to as the "RA refrigerant") in the Rankine cycle 20 by using the generator 25, which is operated by the current control circuit 30, as a driving source. In the present embodiment, for example, the pump 21 has the same shaft as the drive shaft of the expansion unit 23.

The heater 22 is a heat exchanger that performs heat exchange between the RA refrigerant fed from the pump 21 and the cooling water with a high temperature flowing through the radiator circuit 11, thereby to heat the RA refrigerant and transform it into a superheated vapor refrigerant (gaseous phase operation fluid).

The expansion unit 23 is a fluid unit that generates a rotational driving force by the expansion of the RA refrigerant heated through the heater 22. The generator 25 is connected to the drive shaft of the expansion unit 23. The generator 25 is operated by the driving force generated by the expansion unit 23, and the electric power generated by the generator 25 is charged in a battery 33 through an inverter 31 that constitutes the current control circuit 30, which will be described later. The RA refrigerant flowing out from the expansion unit 23 flows to the condenser 24.

The condenser 24 is connected to a discharge side of the expansion unit 23, and is a heat exchanger performing heat exchange with the cooling air blown by a blower fan 28 of the so-called suction type which is the axial flow type and the superheated vapor refrigerant after being expanded, thereby to condense and liquefy the superheated vapor refrigerant into the liquid phase refrigerant. The liquid phase refrigerant flowing out from the condenser 24 flows to the pump 21.

The generator 25 is a rotary machine having both functions of an electric motor and a generator, and is controlled by the current control circuit 30. The pump 21 is connected to the shaft of the generator 25 on one side, and the expansion unit 23 is connected to the shaft of the generator 25 on the opposite side.

The current control circuit 30 is a control unit for controlling the operations of various devices of the waste heat recovery apparatus 1. The current control circuit 30 includes the inverter 31 and a control unit 32 (ECU). The inverter 31 controls the operation of the generator 25 connected to the expansion unit 23. The inverter 31 supplies the electric power from the battery 33 to the generator 25 to operate the generator 25 as the electric motor, to thereby drive the pump 21 and the expansion unit 23. When the generator 25 is operated as the generator by the driving force of the expansion unit 23, the inverter 31 charges the battery 33 with the electric power generated by the generator 25. The current control circuit 30 has a known timer function.

Further, the Rankine cycle 20 includes various sensors such as a cooling water temperature sensor 201 for detecting the temperature Tw of the cooling water flowing into the heater 22, a flow rate sensor 202 for detecting the flow rate Gw of the cooling water flowing through the heater 22, an air speed sensor 203 for detecting the air speed (front air speed) Va in front of (upstream of) the condenser 24, a condenser temperature sensor 204 for detecting the air temperature (front air temperature) Ta in front of (upstream of) the condenser 24, a pump temperature sensor 205 (supercooled degree detector) for detecting the temperature of the refrigerant at the inlet to obtain a supercooled degree (sub-cool) at the inlet of the pump 21, an expansion unit temperature sensor 206 (temperature detector) for detecting the temperature of the refrigerant (temperature of the refrigerant on the inlet side) Tex flowing into the expansion unit 23, an inlet-side pressure sensor 207 (inlet-side pressure detector) for detecting the pressure Pex_in on the inlet side of the expansion unit 23, and an outlet side pressure sensor 208 (outlet-side pressure detector) for detecting the pressure Pex_out on the outlet side of the expansion unit 23.

Based on the detection signals from the above various sensors 201, 202, 203, 204, 205, 206, 207, 208 and the like, the control unit 32 controls the operation of the inverter 31 as well as the shut valve 18, blower fan 28 and generator 25 (pump 21 and expansion unit 23).

(Operation)
(Main Flow)

Figure 2:
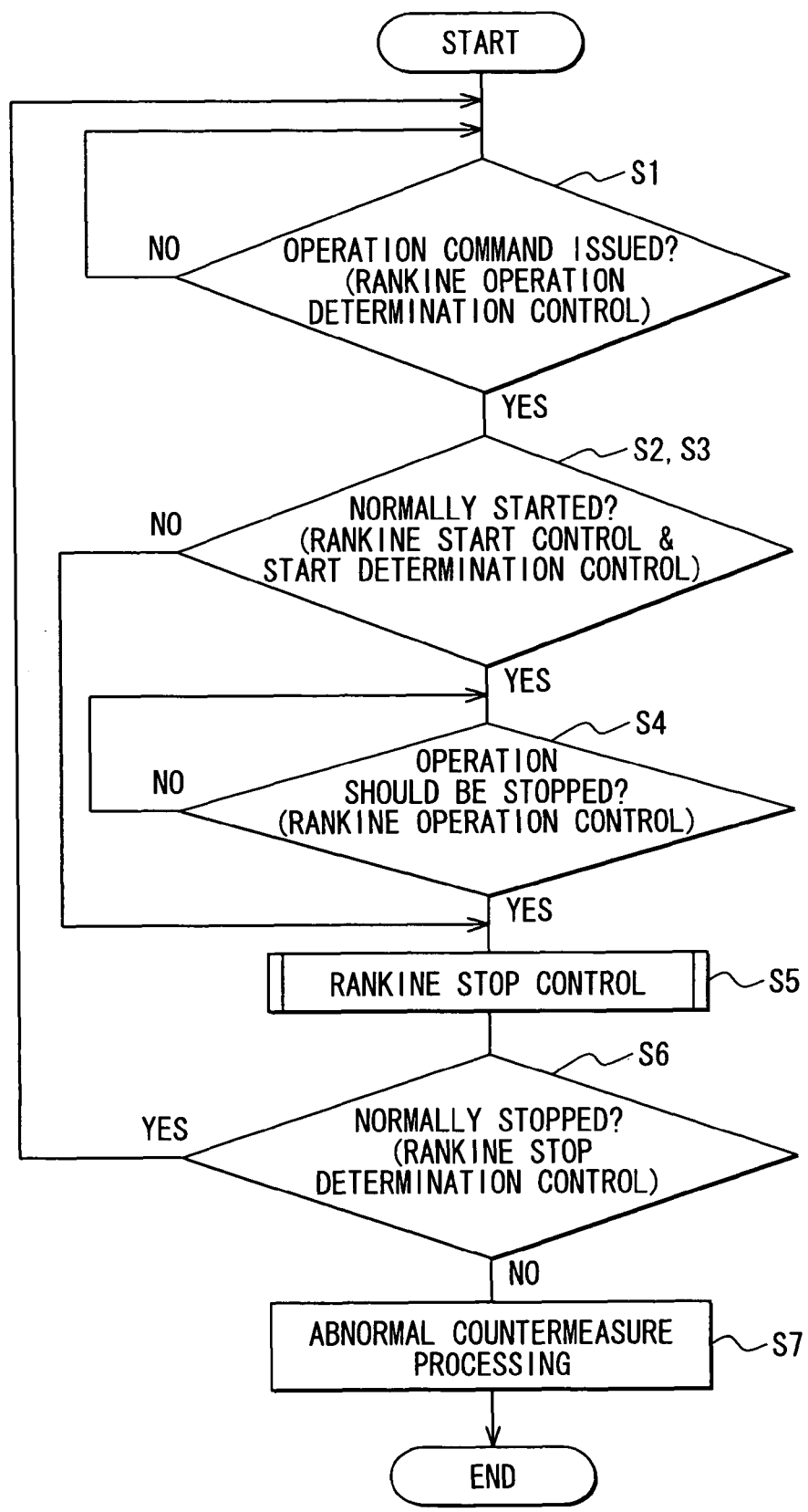
FIG. 2 is a flowchart illustrating a main flow related to controlling the operation of the Rankine cycle according to the first embodiment.

Next, described below are operation, action and effect based on the above constitution. FIG. 2 is a flowchart illustrating a main flow related to a control operation of the Rankine cycle 20 according to the present embodiment.

As shown in FIG. 2, the main flow includes a Rankine operation determination control (S1), Rankine start control & start determination control (S2, S3), a Rankine operation control (S4), a Rankine stop control (S5), a Rankine stop determination control (S6) and an abnormal countermeasure processing (S7).

In the Rankine operation determination control of step S1, it is determined whether a Rankine operation command is issued or not. If the operation command is issued (S1: YES), the routine proceeds to the Rankine start control & start determination control of steps S2 and S3. If the operation command is not issued (S1: NO), step S1 is repeated.

In the Rankine start control & and start determination control of steps S2 and S3, it is determined whether the Rankine cycle 20 has normally started or not. If the Rankine cycle 20 has normally started (S2, S3: YES), the routine proceeds to the Rankine operation control of step S4.

In the Rankine operation control of step S4, it is determined whether the operation of the Rankine cycle 20 should be stopped or not. If there is a command indicative of stopping (S4: YES), the routine proceeds to the Rankine stop control of step S5. If there is no command indicative of the stopping (S4: NO), step S4 is repeated. At steps S2 and S3, if the Rankine cycle 20 has not normally started (S2, S3: NO), the routine proceeds to the Rankine stop control of step S5 without passing through step S4.

After the Rankine stop control of step S5, the routine proceeds to the Rankine stop determination control of step S6.

In the Rankine stop determination control of step S6, it is determined whether the Rankine cycle 20 is normally stopped or not. If the Rankine cycle 20 is normally stopped (S6: YES), the routine returns back to the Rankine operation determination control of step S1 to repeat the main flow thereafter.

In the Rankine stop determination control of step S6, if the Rankine cycle 20 is not normally stopped (S6: NO) i.e., the Rankine cycle 20 is abnormally stopped, the routine proceeds to step S7 where an abnormal countermeasure processing is executed.

Detailed contents of control at control steps S1 to S7 will now be described successively.

(S1: Rankine Operation Determination Control)

Figure 3:
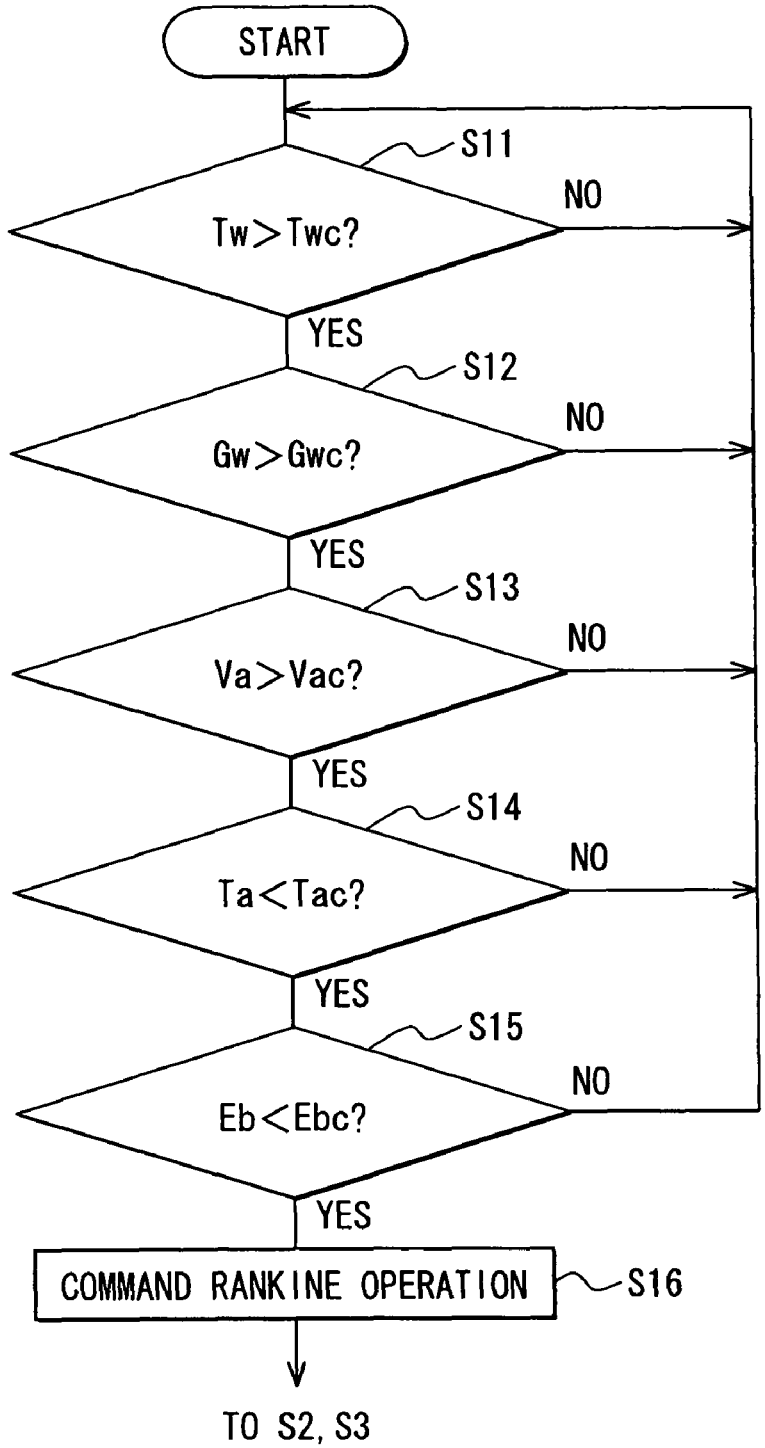
FIG. 3 is a flowchart illustrating a Rankine operation determination control according to the first embodiment.

FIG. 3 is a flowchart illustrating the Rankine operation determination control of step S1 in detail. Referring to FIG. 3, first, at step S11, it is determined whether the cooling water temperature Tw detected by the cooling water temperature sensor 201 is higher than a predetermined value Twc or not. If the cooling water temperature Tw is higher than the predetermined value Twc (S11: YES), the routine proceeds to step S12 where it is determined if the flow rate Gw of the cooling water detected by the flow rate sensor 202 is greater than a predetermined value Gwc. If the cooling water temperature Tw is lower than the predetermined value Twc at step S11 (S11: NO), the processing of step S11 is repeated.

At step S12, if the flow rate Gw of the cooling water is larger than the predetermined value Gwc (S12: YES), the routine proceeds to step S13 where it is determined if the condenser front air speed Va detected by the air speed sensor 203 arranged in front of the condenser 24 is larger than a predetermined value Vac. At step S12, if the flow rate Gw of the cooling water is equal to or smaller than the predetermined value Gwc (S12: NO), the routine returns back to step S11 again.

At step S13, if the condenser front air speed Va is larger than the predetermined value Vac (S13: YES), the routine proceeds to step S14 where it is determined if the condenser front air temperature Ta detected by the condenser temperature sensor 204 is lower than a predetermined value Tac. At step S13, if the condenser front air speed Va is equal to or smaller than the predetermined value Vac (S13: NO), the routine returns back to step S11 again.

At step S14, if the condenser front air temperature Ta is lower than the predetermined value Tac (S14: YES), the routine proceeds to step S15 where it is determined if a battery voltage Eb is lower than a predetermined value Ebc. At step S14, if the condenser front air temperature Ta is equal to or higher than the predetermined value Tac (S14: NO), the routine returns back to step S11 again.

At step S15, if the battery voltage Eb is lower than the predetermined value Ebc (S15: YES), the Rankine operation command is issued at step S16 and, thereafter, the routine proceeds to the Rankine start control & and start determination control (S2, S3). If the battery voltage Eb is equal to or higher than the predetermined value Ebc (S15: NO), the routine returns back to step S11 again.

The predetermined values Twc, Gwc, Vac, Tac and Ebc are set to boundary values of degrees capable of recovering energy by the expansion unit 23 and the generator 25 when the Rankine cycle 20 is started.

As described above, at steps S11 to S15, the Rankine operation command is issued only when the conditions of the cooling water temperature, flow rate of the cooling water, condenser front air speed, condenser front air temperature and battery voltage are all satisfied. If any one of the conditions is not satisfied, the halted state is maintained without issuing the Rankine operation command, and the control routine (step S1) is repeated.

By the control routine (step S1), the Rankine cycle 20 can be operated only when it is in a condition capable of recovering energy sufficiently.

(S2, S3: Rankine Start Control & Start Determination Control)

Figure 4:
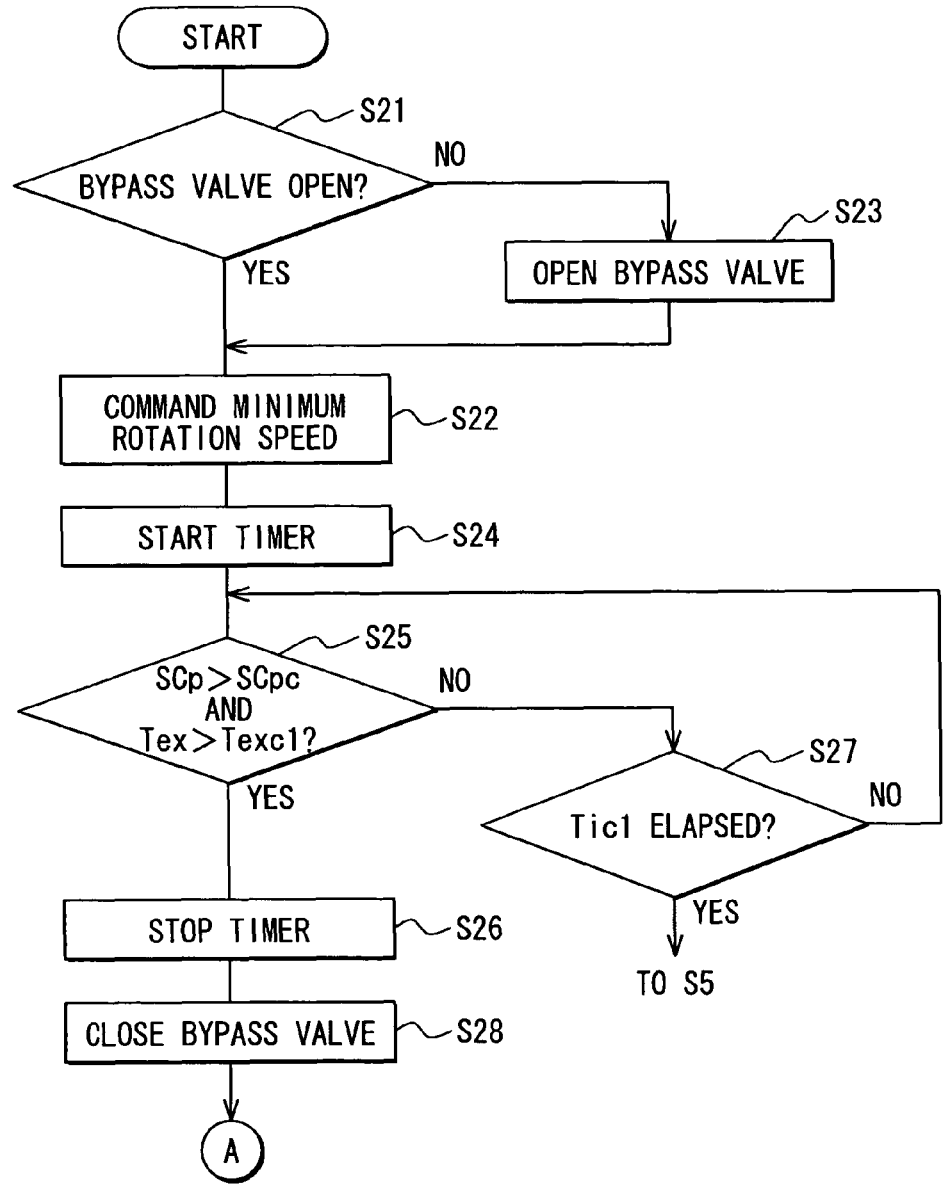
FIG. 4 is a flowchart illustrating a Rankine start control according to the first embodiment.
Figure 5:
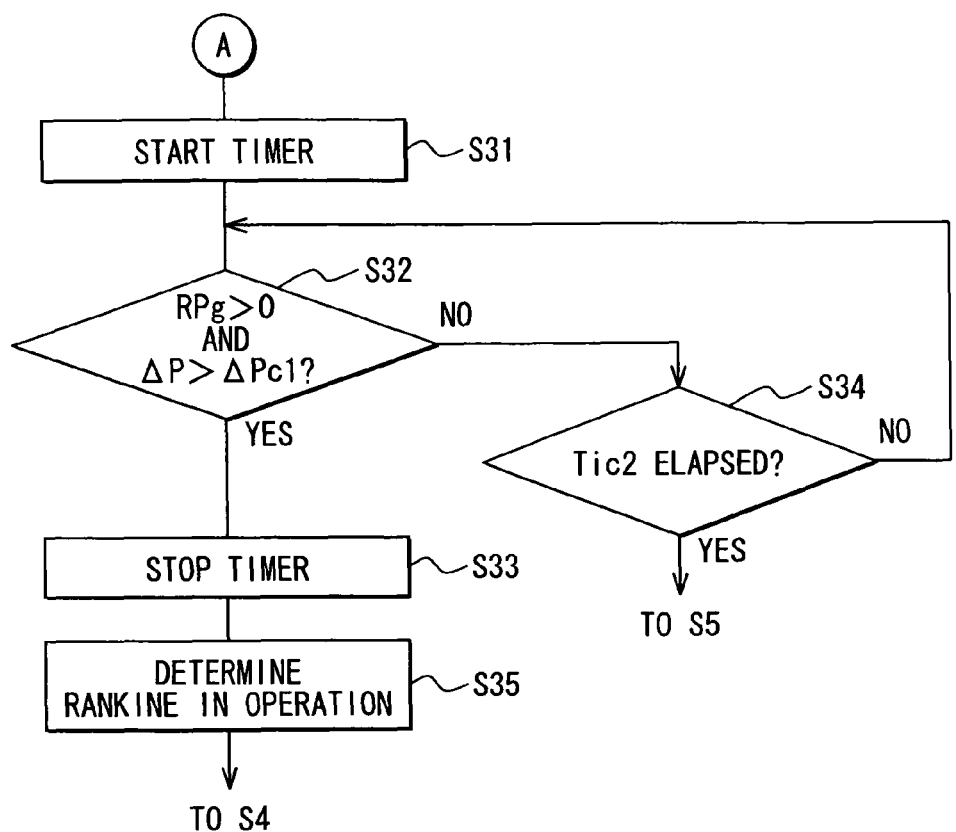
FIG. 5 is a flowchart illustrating a Rankine start determination control executed following the Rankine start control of the first embodiment.

FIG. 4 is a flowchart illustrating, in detail, the Rankine start control of step S2, and FIG. 5 is a flowchart illustrating, in detail, the Rankine start determination control of step S3 executed following step S2.

Referring to FIG. 4, at step S21, it is determined whether the bypass valve 27 is opened or not. If the bypass valve 27 is opened (S21:YES), a minimum rotational speed of the expansion unit is commanded at step S22. The minimum rotational speed can be set to be, for example, 2000 rpm. Responsive to this command, the generator 25 is operated as the electric motor, thereby to drive the pump 21 and the expansion unit 23.

If the bypass valve 27 is determined to be closed at step S21 (S21: NO), the bypass valve 27 is controlled to be opened at step S23.

Even if the expansion unit 23 is driven in a state where the bypass valve 27 is opened, no pressure differential $\Delta P$ occurs between the inlet and the outlet of the expansion unit 23. In driving the expansion unit 23 and the pump 21 at steps S21 to S23, first, the bypass valve 27 is controlled to be opened so that the pressure will not be suddenly generated in the expansion unit 23, in order to avoid sliding contact among the slide members and avoid the sliding members from being worn out under a poorly lubricated state until the lubricating oil circulating together with the RA refrigerant evenly spreads in the Rankine cycle 20.

After the expansion unit 23 and the pump 21 are driven, the timer starts at step S24 and the routine proceeds to step S25. At step S25, it is determined if a supercooled degree (subcool) SCp obtained based on a temperature detected by the pump temperature sensor 205 is larger than a predetermined value SCpc and if the refrigerant temperature Tex at the inlet of the expansion unit obtained by the expansion unit temperature sensor 206 is higher than a predetermined value Texc1.

If the supercooled degree SCp is larger than the predetermined value SCpc and the refrigerant temperature Tex at the inlet of the expansion unit is higher than the predetermined value Texc1 (S25: YES), the timer stops at step S26 and the bypass valve 27 is controlled to be closed at step S28.

At step S25, if either the supercooled degree SCp or the refrigerant temperature Tex at the inlet of the expansion unit is equal to or lower than the predetermined value SCpc or Texc1, the conditions are not satisfied (S25: NO). Thus, it is determined at S27 whether a predetermined period of time Tic1 has passed or not. If the predetermined period of time Ti1 has not passed (S27: NO), the routine returns back to step S25 again and it is determined whether predetermined conditions are satisfied or not.

That is, if the both conditions of the supercooled degree and the refrigerant temperature at the inlet of the expansion unit are satisfied within the predetermined period of time, the routine proceeds to the next Rankine start determination control (step S3, see FIG. 5). If either condition is not satisfied, on the other hand, the routine proceeds to the Rankine stop control (S5) without proceeding to the Rankine start determination control.

After the bypass valve 27 is controlled to be closed at step S28, the timer starts at step S31, as shown in FIG. 5. Next, at step S32, it is determined if a Rankine recovery amount Rpg is larger than 0, and if a pressure differential $\Delta P$ between the inlet-side pressure Pex_in of the expansion unit 23 and the outlet-side pressure Pex_out on the outlet side of the expansion unit 23 is larger than a predetermined value $\Delta$Pc1.

If the Rankine recovery amount Rpg is larger than 0 and the pressure differential $\Delta P$ of the expansion unit 23 is larger than the predetermined value $\Delta$Pc1 (S32: YES), the timer stops at step S33 and it is determined at step S35 that the Rankine cycle 20 is in operation. Thereafter, the routine proceeds to the Rankine operation control (S4: see FIG. 6).

At step S32, on the other hand, if the Rankine recovery amount Rpg is 0 or the pressure differential $\Delta P$ of the expansion unit 23 is equal to or smaller than the predetermined value $\Delta$Pc1 (S32: NO), it is determined at step S34 if a predetermined period of time Tic2 has passed. If the predetermined period of time has not passed (S34: NO), the routine returns back to step S32 again where it is determined if the predetermined conditions are satisfied.

That is, if the both conditions of the Rankine recovery amount Rpg and the pressure differential $\Delta P$ of the expansion unit 23 are satisfied within the predetermined period of time, the routine proceeds to the next Rankine operation control (S4). However, if either one of the conditions is not satisfied, the routine proceeds to the Rankine stop control (S5) without proceeding to the Rankine operation control.

According to the control routine (S2, S3) as described above in detail, at the time of starting the Rankine cycle 20, the conditions (supercooled degree SCp, refrigerant temperature Tex at the inlet of the expansion unit) that serve as prerequisites for the start and the conditions (Rankine recovery amount Rpg, pressure differential $\Delta P$ in the expansion unit 23) in the initial starting period are checked and are confirmed to be proper. Therefore, stable start is assured. Further, the allowable time until the conditions are satisfied is set by using the timer function. Therefore, if proper values are not obtained within the time, the routine is shifted to the stop control, restricting the electric power from being wastefully used for the start.

(S4: Rankine Operation Control)

Figure 6:
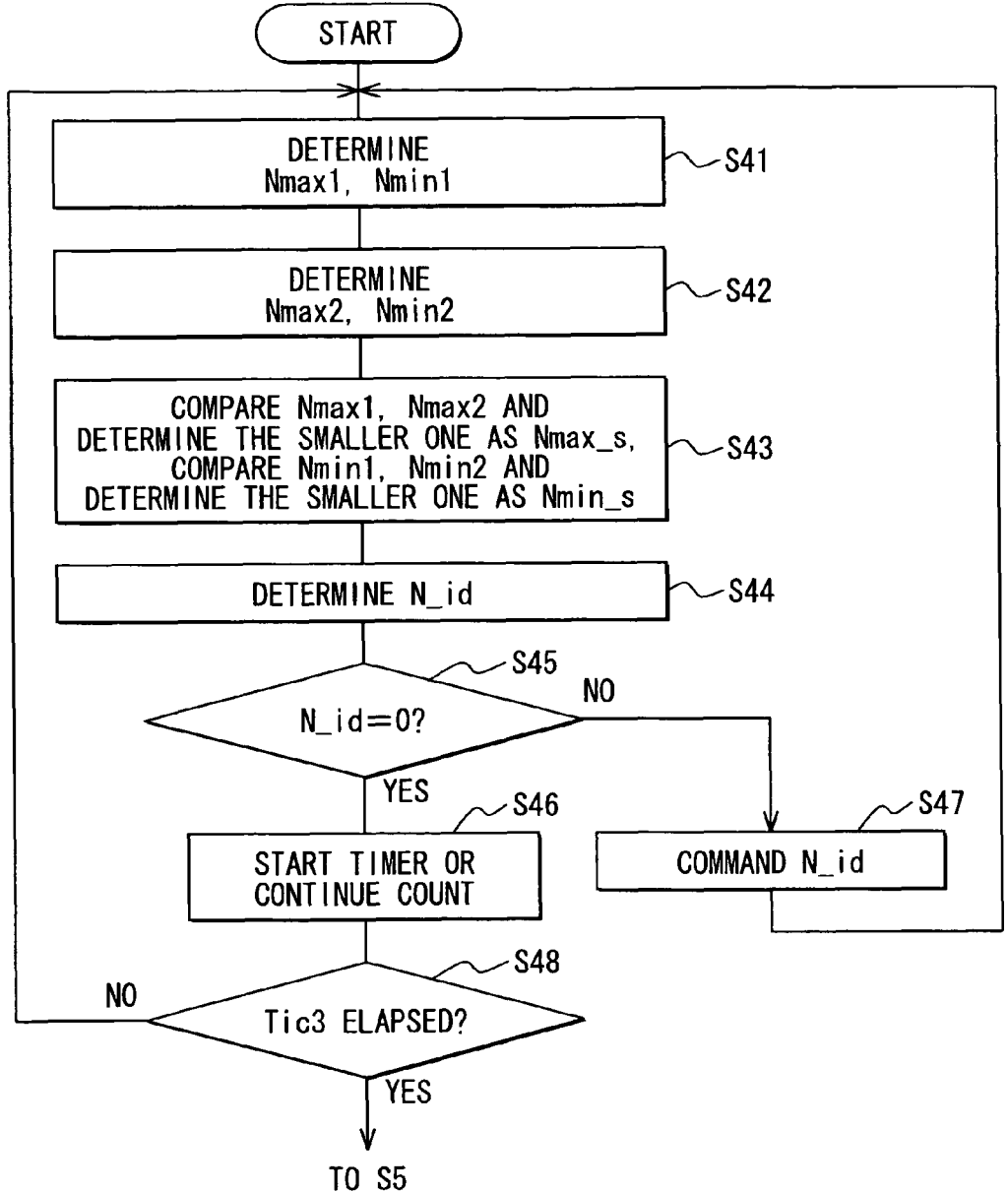
FIG. 6 is a flowchart illustrating a Rankine operation control according to the first embodiment.
Figure 7:
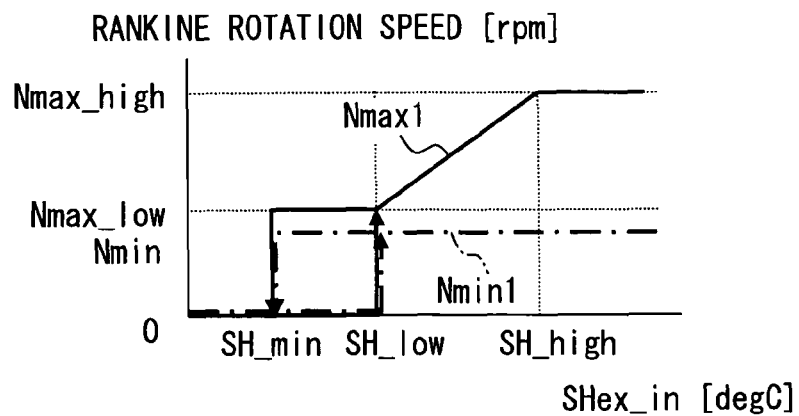
FIG. 7 is a diagram of characteristics illustrating a relationship between a high-pressure side condition and rotational speed (maximum rotational speed, minimum rotational speed) of the expansion unit according to the first embodiment.

FIG. 6 is a flowchart illustrating the Rankine operation control of step S4, which is a characteristic part of the present embodiment. FIG. 7 is a diagram of control characteristics illustrating a relationship between the high-pressure side condition and the rotational speed (maximum rotational speed, minimum rotational speed), FIG. 8 is a diagram of control characteristics illustrating a relationship between the low-pressure side condition and the rotational speed (maximum rotational speed, minimum rotational speed), and FIG. 9 is a diagram of control characteristics illustrating a relationship between the battery voltage and the command rotational speed N_id.

Referring to FIG. 6, first, at step S41, a maximum rotational speed (first maximum rotational speed) Nmax1 and a minimum rotational speed (first minimum rotational speed) Nmin1 of the expansion unit 23 are determined based on the high-pressure side condition relying on FIG. 7. Here, the high-pressure side condition is a superheated degree SH (superheated degree information) at the inlet of the expansion unit 23, the superheated degree SH being obtained based on the refrigerant temperature Tex on the inlet side of the expansion unit 23 detected by the expansion unit temperature sensor 206 and the refrigerant pressure (inlet-side pressure Pex_in).

Figure 8:
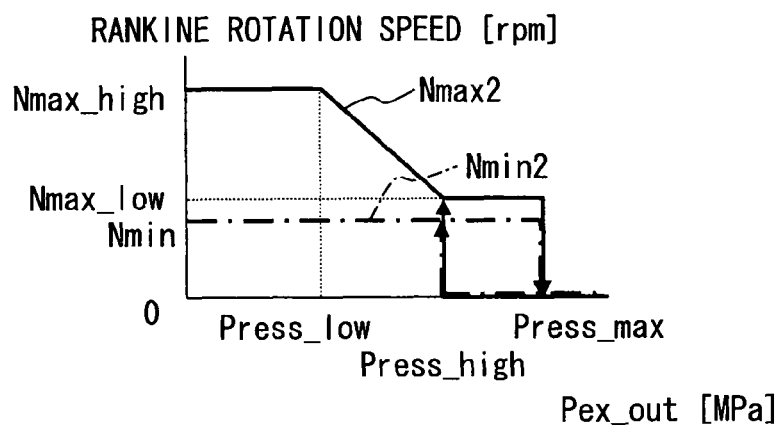
FIG. 8 is a diagram of characteristics illustrating a relationship between a low-pressure side condition and the rotational speed (maximum rotational speed, minimum rotational speed) of the expansion unit according to the first embodiment.
Figure 9:
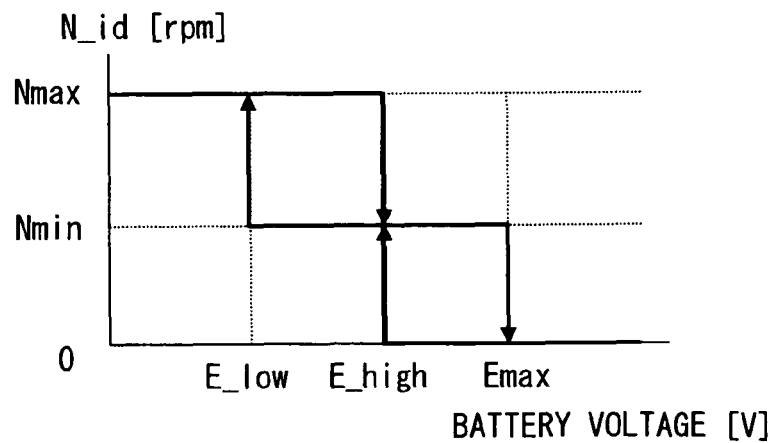
FIG. 9 is a diagram of characteristics illustrating a relationship between the battery voltage and the command rotational speed according to the first embodiment.

Next, at step S42, a maximum rotational speed (second maximum rotational speed) Nmax2 and a minimum rotational speed (second minimum rotational speed) Nmin2 of the expansion unit 23 are determined based on the low-pressure side condition relying on FIG. 8. Here, the low-pressure side condition is the outlet-side pressure Pex_out (pressure information P) on the outlet side of the expansion unit 23 detected by the outlet-side pressure sensor 208.

At step S43, the maximum rotational speeds Nmax1, Nmax2 and minimum rotational speeds Nmin1, Nmin2 are compared, and the smaller values are determined to be the maximum rotational speed Nmax_s and the minimum rotational speed Nmin_s, respectively.

At step S44, the command rotational speed N_id of the expansion unit 23 is determined based on the battery voltage relying on FIG. 9. As shown in FIG. 9, in general, if the battery voltage is low, the command rotational speed N_id is set to be large (e.g., if equal to or lower than E_low, then the command rotational speed N_id is Nmax) and if the battery voltage is high, the command rotational speed N_id is set to be small. Thus, in determining the command rotational speed N_id of the expansion unit 23, the battery voltage is taken into consideration. Therefore, it is less likely that the battery 33 will be overcharged.

After the command rotational speed N_id of the expansion unit 23 is determined, it is determined at step S45 if the command rotational speed N_id is zero. If it is not zero (S45: NO), the command rotational speed N_id of the expansion unit 23 is commanded at step S47, so that the expansion unit 23 and the pump 21 are driven at the command rotational speed N_id. Then, the routine returns back to the processing of step S41.

On the other hand, if the command rotational speed N_id determined at step S44 is zero (S45: YES), the timer starts at step S46 (in a first routine) and then it is determined at step S48 if a predetermined period of time Tic3 has passed. If the predetermined period of time Tic3 has not passed (S48: NO), the routine returns back to step S41 again, and the processing from step S41 to step S45 is executed. If the command rotational speed N_id is still zero (S45: YES) even after the execution of the processing from steps S41 to step S45, the timer continues to count at step S46 (in second and subsequent routines). Then, it is determined again at step S48 if the predetermined period of time Tic3 has passed. If the predetermined period of time Tic3 has passed (S48: YES) the routine shifts to the Rankine stop control (S5).

That is, by the processing of step S45 to step S48 (stop-delaying steps), the Rankine cycle 20 is not immediately stopped in a case where the command rotational speed N_id is zero. The Rankine cycle 20 is stopped in a case where the command rotational speed N_id is continuously zero for a predetermined period of time. In other words, the processing for stopping the Rankine cycle 20 is delayed for a predetermined period of time. As such, the consumption of electric power required for restarting the Rankine cycle 20 can be reduced.

Next, described below are the effects of steps S41 to S43 (maximum/minimum rotational speed determination step). First, briefly described below is a relationship between the rotational speed of the expansion unit 23 and the superheated degree SH. If the rotational speed of the expansion unit 23 is increased, the refrigerant flows in increased amounts. Thus, the evaporation by the heater 22 cannot follow up and the superheated degree SH at the inlet of the expansion unit 23 decreases. Maintaining the superheated degree SH at a sufficiently large level is necessary for the heater 22 to maintain a sufficiently high degree of evaporation, to restrict the RA refrigerant flowing into the expansion unit 23 from assuming the state of two phases, as well as to maintain the viscosity of the lubricating oil circulating through the Rankine cycle 20.

Therefore, the rotational speed can be increased if the superheated degree SH is large. If the superheated degree SH is small, however, it is desired to decrease the rotational speed to obtain a suitable superheated degree SH and to obtain a suitable viscosity of lubricating oil.

Described below is a relationship between the rotational speed of the expansion unit 23 and the outlet-side pressure Pex_out. As the rotational speed is increased, the outlet-side pressure Pex_out is increased. Conversely, as the rotational speed is reduced, the outlet-side pressure Pex out is reduced. Here, the value of the inlet-side pressure Pex_in is determined from a volume ratio of the pump 21 to the expansion unit 23.

If the outlet-side pressure Pex_out is large (pressure differential $\Delta P$ is small), over-expansion may occur. Therefore, the rotational speed can be increased if the outlet-side pressure Pex_out is small (pressure differential $\Delta P$ is large). It is, however, desired to decrease the rotational speed if the outlet-side pressure Pex_out is large.

From the above relationship, the rotational speed can be increased if, for example, the superheated degree SH is sufficiently large. However, an increase in the rotational speed causes an increase in the outlet-side pressure Pex_out, and an over-expansion may take place.

The rotational speed can be increased if the outlet-side pressure Pex_out is very small, the pressure differential $\Delta P$ is sufficiently large and the over-expansion will not take place. However, an increase in the rotational speed may cause an excess decrease in the superheated degree SH. Therefore, among the maximum rotational speeds Nmax1, Nmax2 and minimum rotational speeds Nmin1, Nmin2 obtained based on the superheated degree SH and the outlet-side pressure Pex_out, if the smaller ones are employed, the over-expansion of the expansion unit 23 is suppressed and a sufficiently large superheated degree SH can be maintained.

Thus, by taking the superheated degree SH into consideration as the high-pressure side condition, the refrigerant flowing into the expansion unit 23 is restricted from assuming the gas/liquid two phase state and, besides, it is allowed to sufficiently maintain the viscosity of the lubricating oil for lubricating the expansion unit 23.

Further, by taking the outlet-side pressure Pex_out of the expansion unit 23 into consideration as the low-pressure side condition, it is allowed to maintain a sufficient pressure differential $\Delta P$ from the inlet-side pressure Pex_in and to suppress the over-expansion in the expansion unit 23. That is, the Rankine cycle 20 can be stably operated.

(S5: Rankine Stop Control)

Figure 10:
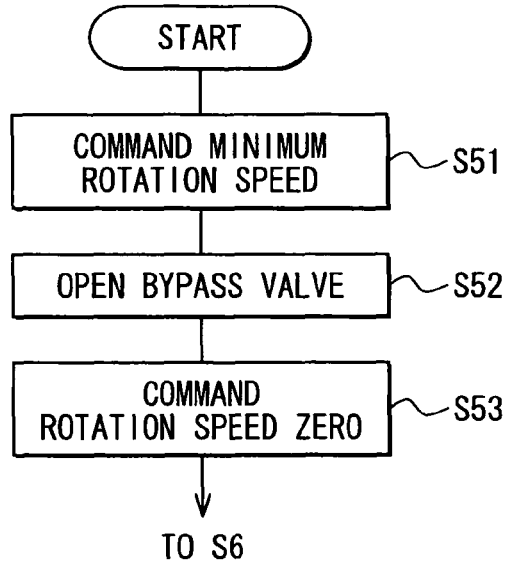
FIG. 10 is a flowchart illustrating a Rankine stop control according to the first embodiment.

FIG. 10 is a flowchart illustrating a Rankine stop control of step S5 in detail.

Referring to FIG. 10, first, a minimum rotational speed of the expansion unit is commanded at step S51, and then, the bypass valve 27 is controlled to be opened at step S52. Thereafter, the rotational speed of the expansion unit is commanded to be zero at step S53 to bring the expansion unit 23 and the pump 21 into a halt. Thereafter, the routine shifts to a next Rankine stop determination control (S6). The "minimum rotational speed of the expansion unit" referred to here is different from the minimum rotational speed Nmin_s obtained at step S43 in FIG. 6, but is a predetermined value.

According to the control routine (S5), at the time of stopping the Rankine cycle 20, the bypass valve 27 is opened after the rotational speed of the expansion unit 23 is decreased down to a predetermined rotational speed, and, thereafter, the rotational speed of the expansion unit is commanded to be zero. In this way, the operation is stopped after having eliminated the pressure differential $\Delta P$ in the expansion unit 23 by opening the bypass valve 27. Therefore, the expansion unit 23 is restricted from running out of control, and the Rankine cycle 20 is stably brought into a halt.

(S6: Rankine Stop Determination Control)

Figure 11:
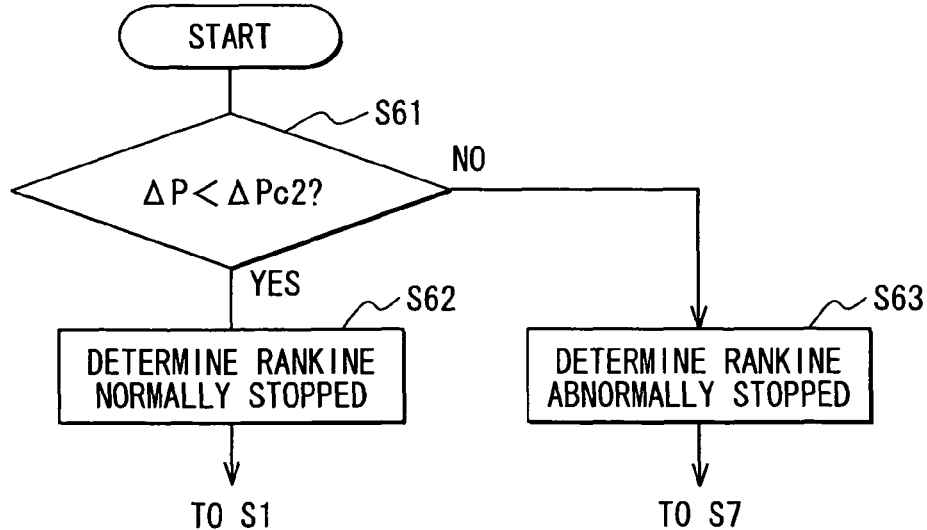
FIG. 11 is a flowchart illustrating a Rankine stop determination control according to the first embodiment.

FIG. 11 is a flowchart illustrating a Rankine stop determination control of step S6 in detail.

Referring to FIG. 11, first, it is determined at step S61 if the pressure differential ΔP in the expansion unit 23 is lower than a predetermined value ΔPc2. If the pressure differential ΔP is lower than the predetermined value ΔPc2 (S61: YES), it is determined at step S62 that the Rankine cycle 20 has been normally stopped. Thus, the routine returns back to the Rankine operation determination control (S1) to repeat the control of the main flow (FIG. 2).

If the pressure differential ΔP is equal to or higher than the predetermined value ΔPc2 (S61: NO), it is determined at step S63 that the Rankine cycle 20 has been abnormally stopped, and thus the routine proceeds to an abnormal countermeasure processing (S7, FIG. 12).

According to the control routine (S6), the pressure differential ΔP in the expansion unit 23 is used as a reference for determination. The main flow is not repeated in a case where the Rankine cycle 20 is abnormally stopped. Therefore, the Rankine cycle 20 which maintains a high reliability can be realized.

(S7: Abnormal Countermeasure Processing)

If the Rankine cycle 20 is abnormally stopped, the abnormal countermeasure processing is executed. Concretely, for example, the shut valve 18 is controlled to be closed. In this case, since no cooling water flows into the heater 22, the operation of the Rankine cycle 20 can be forcibly brought into a halt.

Second Embodiment

Next, a second embodiment of the present invention will be described with reference to FIGS. 12 and 13. In the present embodiment, steps common to those of the first embodiment are denoted by the same reference numerals as those of the first embodiment, and described below are portions different from those of the first embodiment.

Figure 12:
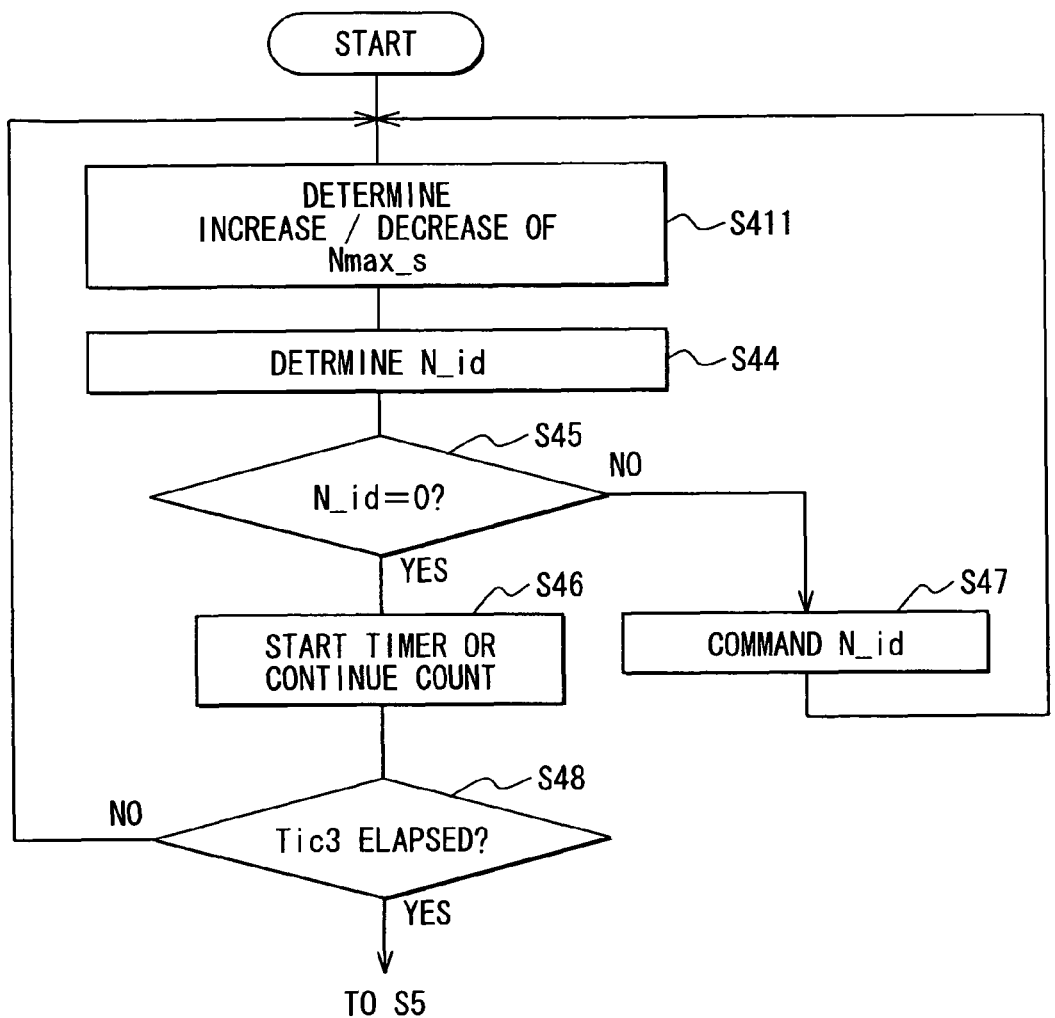
FIG. 12 is a flowchart illustrating the Rankine operation control according to a second embodiment of the present invention.

FIG. 12 is a flowchart illustrating the Rankine operation control (S4) according to the present embodiment in detail. In the present embodiment, the Rankine operation control (S4) has a maximum/minimum rotational speed setting step (S411), which is different from the first embodiment. The constitution of devices and other controls are the same as those of the first embodiment. Therefore, described below in detail is the maximum/minimum rotational speed setting step (S411), and other portions are not described again.

Referring to FIG. 12, at step S411, an increase or decrease of the maximum rotational speed $N_{max\_s}$ of the expansion unit 23 is determined in accordance with the superheated degree SH at the inlet of the expansion unit 23 and a value of pressure ratio Pr of the expansion unit 23 (pressure information P in the present embodiment). A minimum rotational speed $N_{min\_s}$ is presumed to be constant. Here, the pressure ratio Pr of the expansion unit 23 is expressed by a ratio (Pr=$P_{ex\_in}/P_{ex\_out}$) of the inlet-side pressure $P_{ex\_in}$ to the outlet-side pressure $P_{ex\_out}$.

FIG. 13 is a diagram illustrating an increase and a decrease in the maximum rotational speed $N_{max\_s}$ of the expansion unit 23 based on the superheated degree SH and the pressure ratio Pr. Here, a constant value of minimum rotational speed $N_{min\_s}$ and an initial value of maximum rotational speed $N_{max\_s}$ can be set to be predetermined values, respectively. What serves as a reference of "increase or decrease" in the maximum rotational speed $N_{max\_s}$ is a predetermined initial value in the first routine and, and is a value of maximum rotational speed $N_{max\_s}$ after the preceding routine in the second and subsequent routines. In FIG. 13, further, a limit value has been set in advance when the maximum rotational speed $N_{max\_s}$ is increased; i.e., the maximum rotational speed $N_{max\_s}$ is controlled so as not to exceed its limit value. Further, a limit value of when the maximum rotational speed $N_{max\_s}$ is decreased has been set to be a value (constant value) of minimum rotational speed $N_{min\_s}$. The value of minimum rotational speed $N_{min\_s}$ assumes 0 only when the pressure ratio Pr and the superheated degree SH are both in minimum regions (Pr<Pr_min, SH<SH_min).

In the dotted portions which indicate "no change" in FIG. 13, the superheated degree SH and the pressure ratio Pr assume suitable values at the maximum rotational speed Nmax s and, therefore, the maximum rotational speed $N_{max\_s}$ may be maintained; i.e., there is no increase or decrease (increment/decrement=zero), and the maximum rotational speed $N_{max\_s}$ is maintained unchanged.

Considered below is a case where, for example, a region Q1 where the pressure ratio Pr and the superheated degree SH are both in proper ranges (Pr_low<Pr<Pr_high, SH_min<SH<SH_low) has shifted to a region Q2 where the pressure ratio Pr has decreased due to a change in the vehicle condition (Pr_min<Pr<Pr_low, SH_min<SH<SH_low).

In this case, a decrease in the pressure ratio Pr means an increase in the pressure $P_{ex\_out}$ on the outlet side. Here, any further increase in the pressure $P_{ex\_out}$ on the outlet side may cause an over-expansion. Therefore, "decrease" (increment/decrement assumes a minus value) is selected so as to decrease the maximum rotational speed $N_{max\_s}$.

Further, considered below is a case where, for example, the region Q1 has shifted to a region Q3 where the superheated degree SH has decreased due to a change in the vehicle condition (Pr_low<Pr<Pr_high, SH<SH_min).

In this case, since the superheated degree SH is not higher than a proper value, "decrease" (increment/decrement assumes a minus value) is selected so as to maintain the superheated degree SH by decreasing the maximum rotational speed $N_{max\_s}$.

Further, considered below is a case where, for example, a region Q4 where the pressure ratio Pr and the superheated degree SH are both in proper ranges (Pr_low<Pr<Pr_high, SH>SH_high) has shifted to a region Q5 where the pressure ratio Pr has increased due to a change in the vehicle condition (Pr>Pr_high, SH>SH_high).

In this case, since the pressure ratio Pr and the superheated degree SH both assume proper and sufficient values, an "increase" (increment/decrement assumes a plus value) is selected to increase the maximum rotational speed $N_{max\_s}$ so that the battery 33 recovers the electric energy at a maximum efficiency (amount of recovery is increased).

According to the present embodiment as described above, upon setting the amount of increment in the "increase" to be small, if the conditions of the pressure ratio Pr and the superheated degree SH fall on the region Q5 due to a change in the vehicle condition and if the condition (Pr>Pr_high, SH>SH_high) continues, the rotational speed (maximum rotational speed Nmax, command rotational speed N_id) is controlled so as to gradually increase.

Upon setting the increment/decrement to a suitable degree as described above, the command rotational speed N_id is not greatly varied but is mildly varied in case the vehicle conditions (engine operating condition, increase in the amount of cooling water flowing into the heater 22, etc.) have sharply changed, making it possible to realize more smooth and sophisticated control.

Modified Examples of First and Second Embodiments

In the above first embodiment, the pressure information P as the low-pressure side condition was the outlet-side pressure Pex_out of the expansion unit 23. Instead, the pressure information P may be, for example, a differential pressure ΔP (inlet-side pressure Pex_in—outlet-side pressure Pex_out) between the pressure Pex_in on the inlet side and the pressure Pex_out on the outlet side of the expansion unit 23. In this case, the diagram of characteristics shown in FIG. 14 can be used, in place of the diagram of characteristics explained in FIG. 8, to obtain the same effect as that of the above first embodiment.

In the diagram of characteristics (FIG. 9) in which the battery voltage is taken into consideration at step S44 (see FIGS. 6 and 12) in the first and second embodiments, the command rotational speed N_id may be continuously varied instead of being varied stepwise. In this case, the diagram of characteristics shown in FIG. 15 can be used. When the battery voltage lies between E_low and E_high, in particular, the command rotational speed N_id is continuously varied expanding the variation that can be assumed by the command rotational speed N_id of the expansion unit 23 and making it possible to realize a more sophisticated control.

Figure 16:
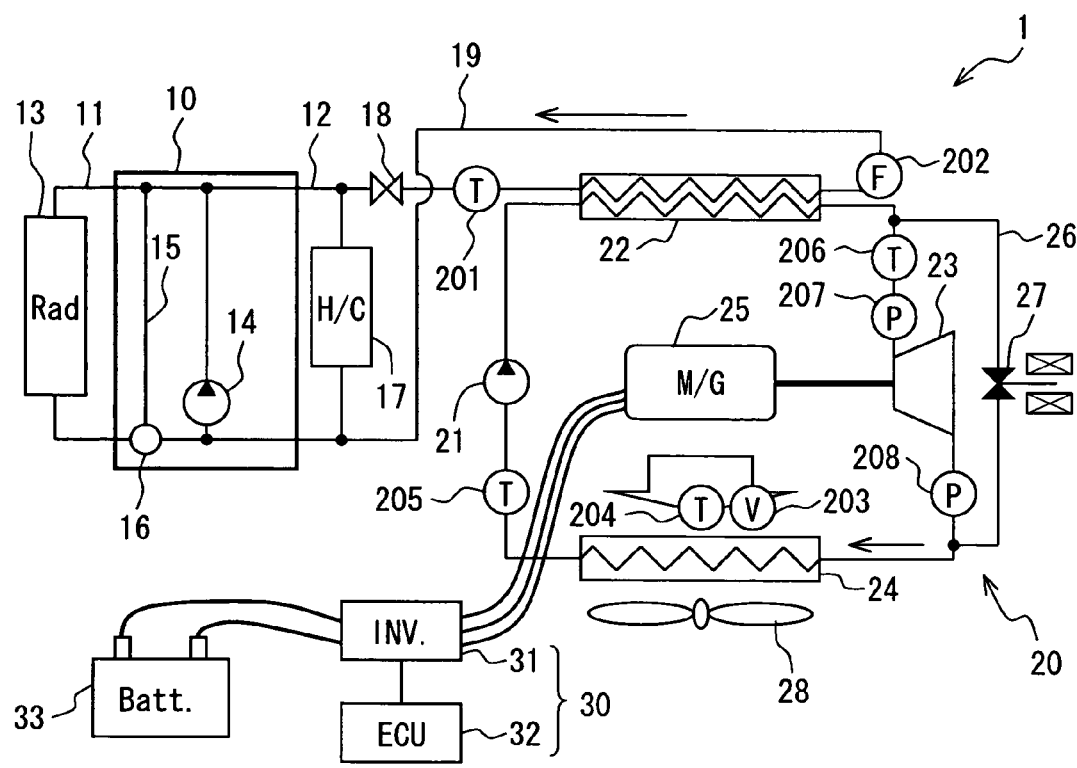
FIG. 16 is a diagram schematically illustrating the whole system of a waste heat recovery apparatus having the Rankine cycle according to a still another modified example of the first and second embodiments.

In the above first and second embodiments, the pump 21 and the expansion unit 23 were driven by the same shaft, which, however, may not be driven by the same shaft (pump 21 may be driven by a dedicated electric motor (not shown)) as shown in FIG. 16.

Third Embodiment

A third embodiment of the present invention will now be described with reference to FIGS. 17 to 20C.

Figure 17:
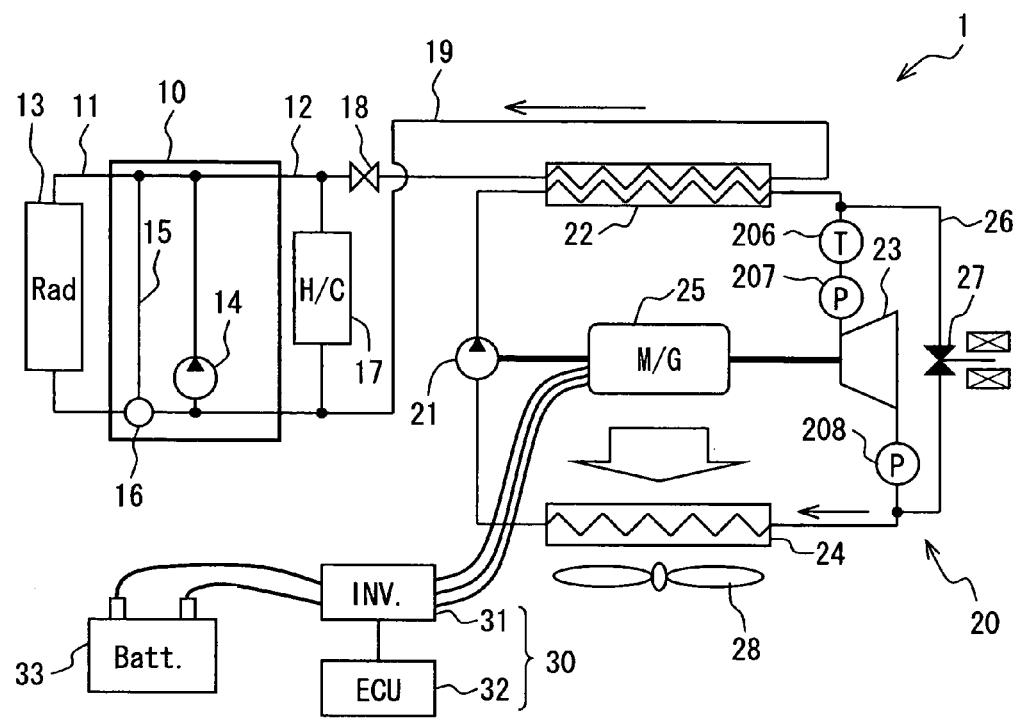
FIG. 17 is a diagram schematically illustrating the whole system of the waste heat recovery apparatus having the Rankine cycle according to a third embodiment of the present invention.
Figure 18:
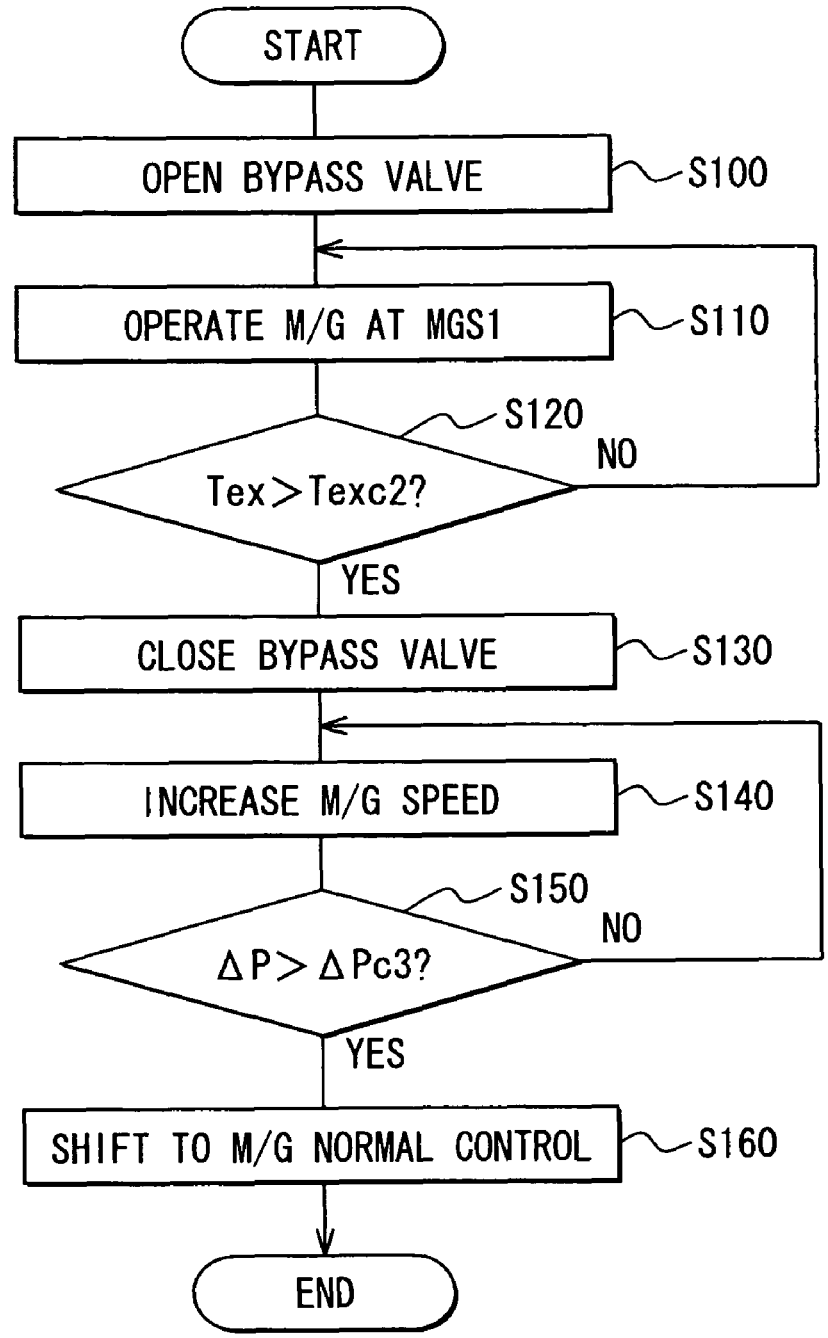
FIG. 18 is a flowchart illustrating the Rankine start control according to the third embodiment.
Figure 19:
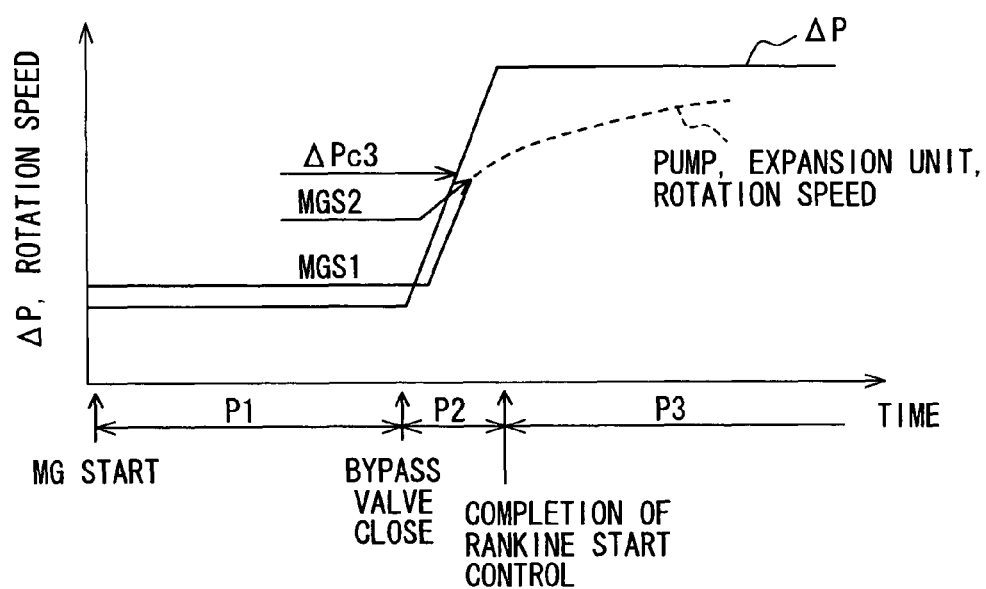
FIG. 19 is a time chart illustrating a pressure differential in the expansion unit and the rotational speed of the pump and expansion unit from the start to the normal control of the Rankine cycle according to the third embodiment.
Figure 20A:
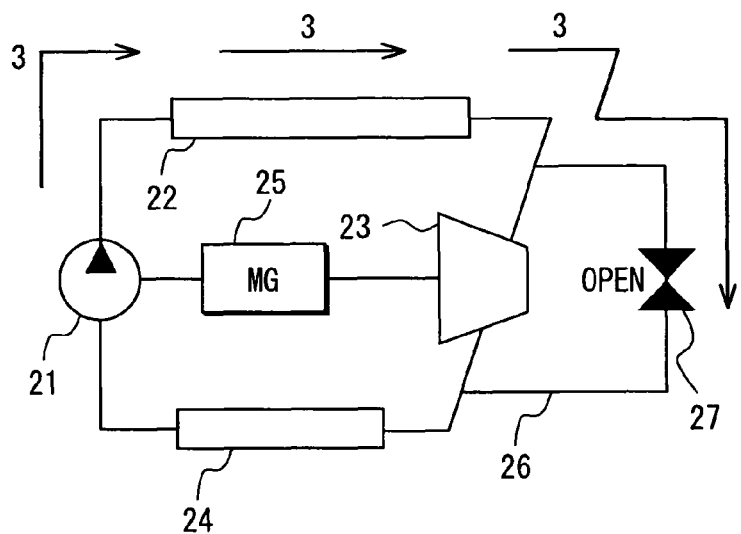
FIGS. 20A to 20C are diagrams schematically illustrating the flow rates of the refrigerant at various portions at the start of the Rankine cycle according to the third embodiment.
Figure 20B:
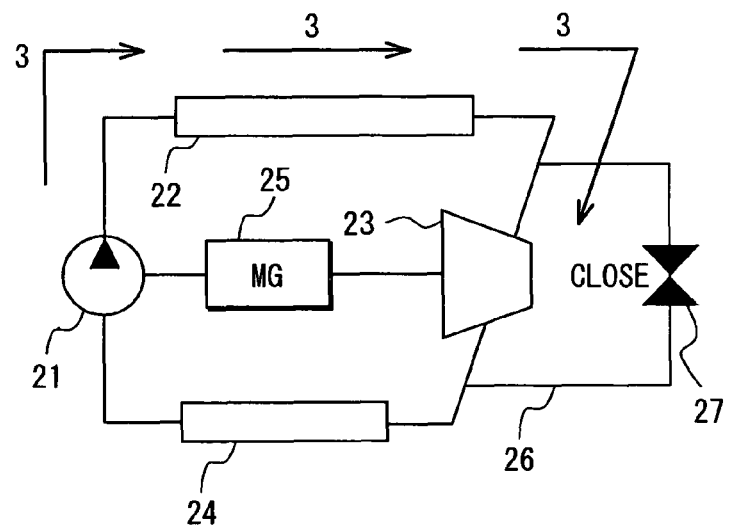
Figure 20C:
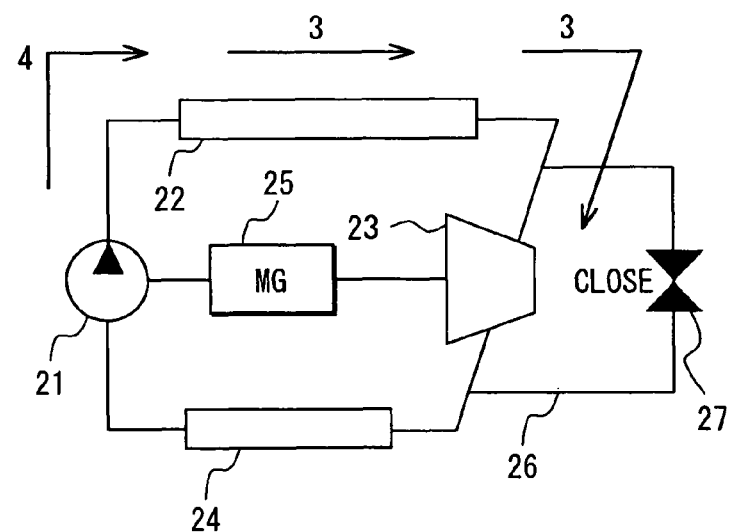

FIG. 17 is a diagram schematically illustrating the whole system of the waste heat recovery apparatus 1 having the Rankine cycle 20 according to the present embodiment. FIG. 18 is a flowchart illustrating a control (Rankine start control S2a) at the start of the Rankine cycle 20 which is a characteristic portion of the present embodiment, FIG. 19 is a time chart illustrating the pressure differential in the expansion unit and the rotational speed of the pump and expansion unit from the start of the Rankine cycle 20 up to the normal control, and FIGS. 20A to 20C are diagrams schematically illustrating the flow rates of the refrigerant at various portions at the start of the Rankine cycle 20.

In the present embodiment, the pump 21 is connected to the generator 25 and to the expansion unit 23 through the same drive shaft. Hereinafter, the same portions as those of the first embodiment are denoted by the same reference numerals, and a description thereof is not repeated.

(S2a: Rankine Start Control)

In starting the Rankine cycle 20, the current control circuit 30 opens the shut valve 18 and operates the blower fan 28. As shown in FIG. 18, further, the bypass valve 27 is opened at step S100, and the generator 25 is operated as an electric motor at a predetermined rotational speed (expansion unit predetermined rotational speed MGS1 in FIG. 19) at step S110. Here, the predetermined rotational speed has been determined in advance as a rotational speed (e.g., 1500 rpm) on the minimum side that can be controlled by the inverter 31.

Upon operating the generator 25, the pump 21 and the expansion unit 23 are operated, and the RA refrigerant circulates in the Rankine cycle 20. In this case, since the bypass valve 27 has been opened, the RA refrigerant flows chiefly through the bypass passage 26 (FIG. 20A) while also flowing through the expansion unit 23. Since the RA refrigerant chiefly flows through the bypass passage 26, no pressure differential (hereinafter, expansion unit pressure differential) occurs between the inlet and the outlet of the expansion unit 23 (period P1 in FIG. 19: from the start of MG until the bypass valve is closed).

When the RA refrigerant circulates through the Rankine cycle 20, the lubricating oil contained in the RA refrigerant evenly spreads among various slide portions of the expansion unit 23 and the pump 21. Thus, the expansion unit 23 and the pump 21 are placed in a lubricated state.

Next, at step S120, it is determined if the refrigerant temperature Tex at the inlet of the expansion unit detected by the expansion unit temperature sensor 206 is equal to or higher than a predetermined temperature Texc2. If it is equal to or higher than the predetermined temperature Texc2, the bypass valve 27 is closed at step S130. If it is determined at step S120 that the refrigerant temperature Tex at the inlet of the expansion unit is lower than the predetermined temperature Texc2, the processing of step S110 is continued.

Here, the predetermined temperature Texc2 is the temperature that has been determined in advance as a refrigerant temperature (refrigerant superheating degree) for sufficiently driving the expansion unit 23 by the expansion of the superheated vapor refrigerant flowing into the expansion unit 23. The predetermined temperature may be set, for example, to a value (60 to 70° C.) lower by about 20° C. than the temperature (80 to 90° C.) of the engine cooling water.

Upon closing the bypass valve 27, the refrigerant flow of the bypass passage 26 is interrupted, and thus the RA refrigerant all flows through the expansion unit 23 (FIG. 20B) Here, the expansion unit 23 acts as a drag and produces an expansion unit pressure differential ΔP (period P2 in FIG. 19: from when the bypass valve is closed until the completion of the cycle start). The current control circuit 30 calculates the expansion unit pressure differential as a difference between the inlet-side refrigerant pressure detected by the inlet-side pressure sensor 207 and the outlet-side refrigerant pressure detected by the outlet-side pressure sensor 208.

The current control circuit 30 increases the rotational speed of the generator 25 until the expansion unit pressure differential ΔP reaches a predetermined pressure differential (predetermined difference in pressure) ΔPc3 by repeating steps S140 and S150. The predetermined pressure differential herein is a pressure differential determined in advance from a relationship between the volume and the pressure of the expansion unit 23 so that a proper expansion operation is attained (prohibiting over-expansion operation or insufficient expansion operation). Further, the rotational speed of the generator 25 is controlled so as to continuously and monotonously increase (linearly increase) from a predetermined value MGS1 up to MGS2 (period P3 in FIG. 19: from when the bypass valve is closed until the completion of the cycle start control).

If it is determined at step S150 that the expansion unit pressure differential has reached the predetermined pressure differential ΔPc3, the routine at step S160 shifts to the normal control of the generator 25, and the Rankine start control ends.

(Normal Rankine Control)

After the above Rankine start control, the current control circuit 30 controls the rotational speed of the generator 25 and the rotational speed of the blower fan 28 so that the expansion unit pressure differential becomes a predetermined pressure differential, whereby the waste heat energy of the engine 10 is converted into mechanical energy through the expansion unit 23 and is, further, converted into electric energy through the generator 25.

That is, in the normal Rankine control, the expansion unit 23 is driven by the expansion of the superheated vapor refrigerant from the heater 22. Therefore, the pump 21 is driven by the driving force of the expansion unit 23, and the refrigerant continues to circulate in the Rankine cycle 20.

When the driving force of the expansion unit 23 exceeds the driving force for driving the pump 21, then the generator 25 is operated as the generator, and the control unit 32 charges the battery 33 with electric power generated by the generator 25 through the inverter 31. The electric power charged in the battery 33 is fed to various auxiliary units.

(Rankine Stop Control)

When the amount of electric power stored in the battery 33 exceeds a predetermined value or when the waste heat of the engine 10 (superheated degree of the refrigerant at the inlet of the expansion unit) is not sufficient, the current control circuit 30 brings the operation of the Rankine cycle 20 into a halt. To bring the operation of the Rankine cycle 20 into a halt, the rotational speed of the generator 25 is decreased down to a minimum rotational speed, the bypass valve 27 is opened and, after having confirmed that the differential pressure in the expansion unit has been sufficiently decreased, the operation of the generator 25 is halted to thereby bring the pump 21 and the expansion unit 23 into a halt. The blower fan 28 is also halted.

Here, in a case where some abnormal condition has occurred while the Rankine cycle 20 is in operation, the current control circuit 30 closes the shut valve 18 to block the flow of the engine cooling water into the heater 22, and thereby to forcibly bring the operation of the Rankine cycle 20 into a halt.

At the start of the Rankine cycle 20 in the present embodiment as described above, the Rankine start control S2a shown in FIG. 18 is executed. Namely, the bypass valve 27 is, first, opened to operate the generator 25 as the electric motor at a predetermined rotational speed to thereby operate the pump 21 and the expansion unit 23. In this case, the refrigerant chiefly flows through the bypass passage 26 while also flowing into the expansion unit 23. Therefore, the refrigerant circulates through the Rankine cycle 20 without producing the expansion unit differential pressure, and the lubricating oil contained in the refrigerant is fed to various sliding portions in the pump 21 and the expansion unit 23. That is, in the initial stage of start, the pump 21 and the expansion unit 23 are placed in a state of being lubricated ready to operate.

If the refrigerant temperature (superheated degree) at the inlet of the expansion unit exceeds the predetermined temperature, the refrigerant is in a sufficiently superheated state, and it can be confirmed that the expansion unit 23 is in a state of capable of being operated by the expansion of the refrigerant (superheated vapor refrigerant).

In this state, the bypass valve 27 is closed. Therefore, the refrigerant is switched from the bypass passage 26 to the expansion unit 23, and therefore, the expansion unit 23 can be operated by the expansion of the refrigerant.

At this time, the pressure differential occurs in the expansion unit. Upon increasing the operating rotational speed of the generator 25 in accordance with the pressure differential in the expansion unit relative to the predetermined rotational speed, however, the operating rotational speed of the expansion unit 23 can be increased and the discharge capability of the expansion unit 23 can be successively increased, making it possible to relax the rising characteristics of differential pressure in the expansion unit (rate of increase in the pressure differential relative to the time). Namely, as shown in FIG. 20C, it is presumed that the pump 21 is driven at a predetermined rotational speed (e.g., 1500 rpm) and discharges the refrigerant at a flow rate 3. In this case, if the rotational speed of the generator 25 increases (e.g., 1500 rpm→2000 rpm), the rotational speed of the expansion unit 23 has been increased already (2000 rpm) by the time when the refrigerant flows into the expansion unit 23. Namely, the expansion unit 23 undergoes the expansion operation to discharge the refrigerant at a flow rate 4 relative to the refrigerant of the flow rate 3. Since this relationship repeats hereinafter, the degree of increase in the differential pressure in the expansion unit can be relaxed.

Accordingly, it is less likely that the rapid differential pressure will occur in the expansion unit. As such, the Rankine cycle 20 can be stably started.

Modified Example of Third Embodiment

Figure 21A:
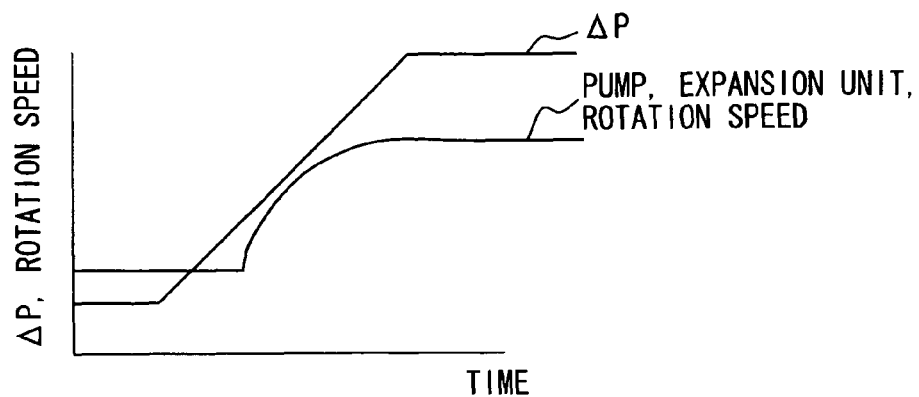
FIGS. 21A and 21B are time charts illustrating the pressure differential in the expansion unit and the rotational speed of the pump expansion unit from the start to the normal control of the Rankine cycle according to a modified example of the third embodiment.

In the above third embodiment, the rotational speed of the generator 25 (rotational speed of the pump 21 and the expansion unit 23) is controlled so as to continuously and monotonously increase (linearly increase) in accordance with the rise of pressure differential in the expansion unit. Alternatively, the rotational speed may be controlled so that the rate of increase thereof decreases with the passage of time, as shown in FIG. 21A.

Figure 21B:
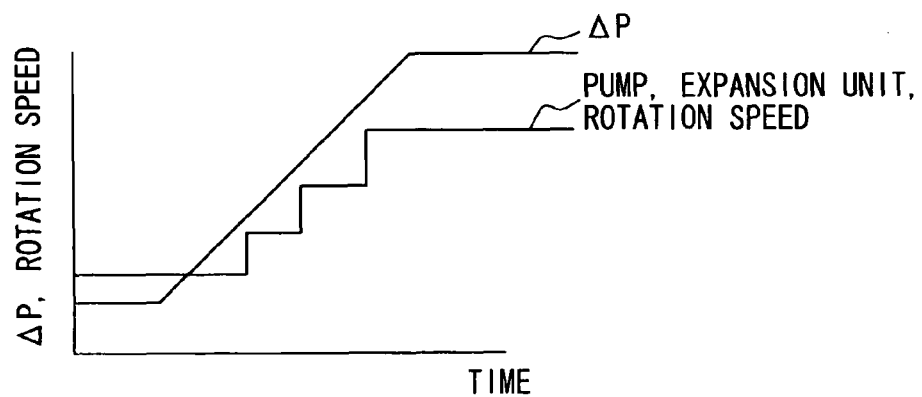

Further, the rotational speed of the generator 25 (rotational speed of the pump 21 and the expansion unit 23) may be controlled so as to increase stepwise, as shown in FIG. 21B.

In these cases, similar to the case of FIG. 19, it is allowed to reliably suppress the occurrence of sharp pressure differential in the expansion unit 23.

Fourth Embodiment

Figure 22:
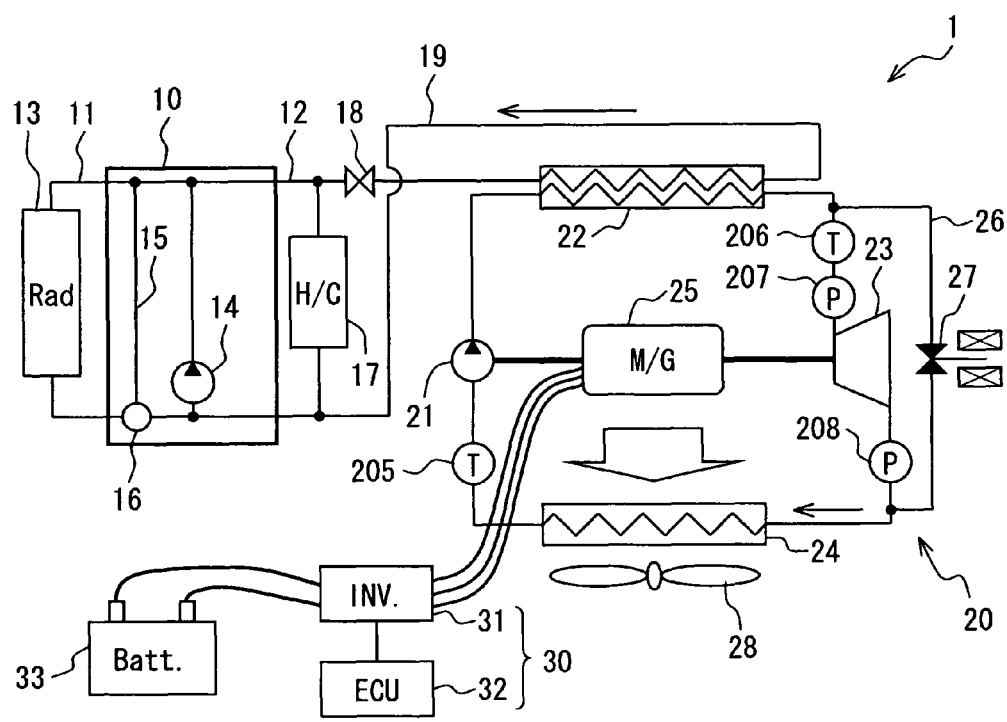
FIG. 22 is a diagram schematically illustrating the whole system of the waste heat recovery apparatus having the Rankine cycle according to a fourth embodiment of the present invention.
Figure 23:
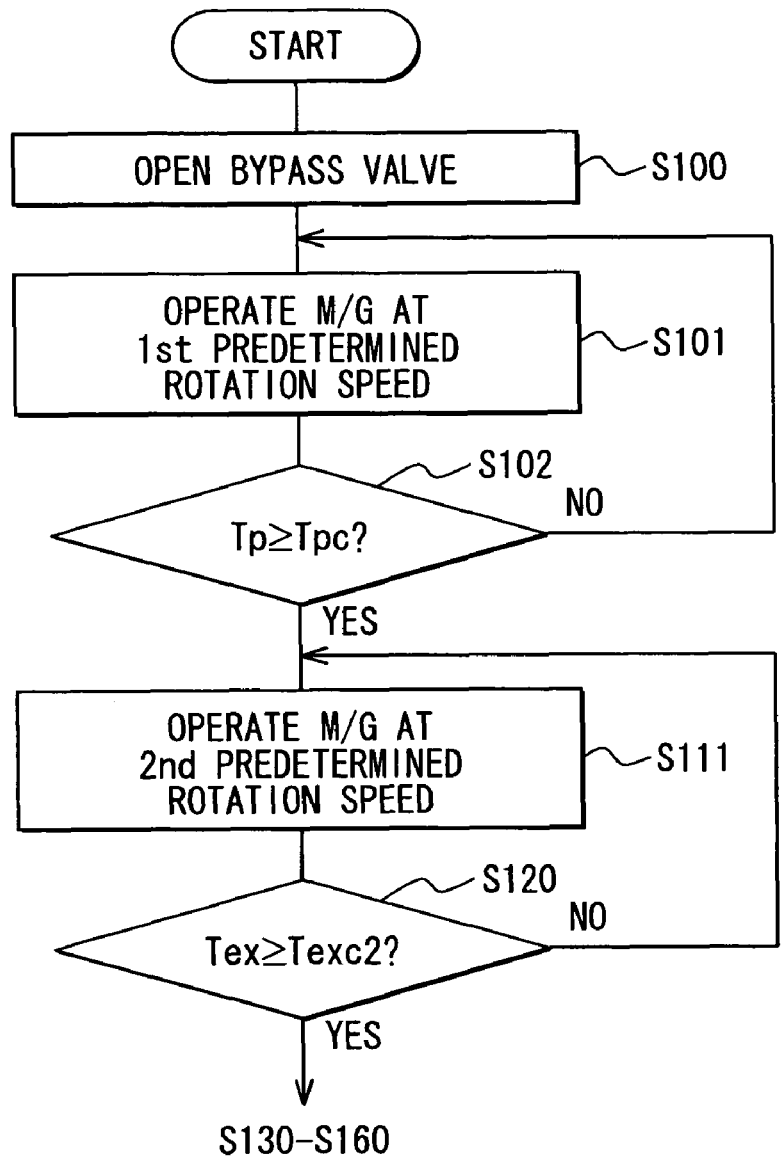
FIG. 23 is a flowchart illustrating the Rankine start control according to the fourth embodiment.
Figure 24:
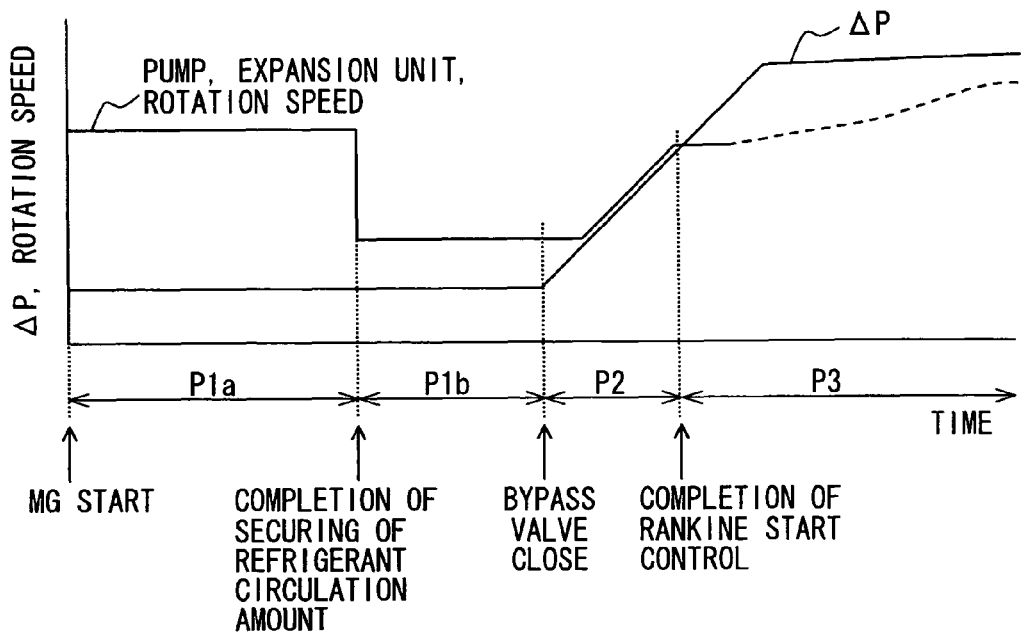
FIG. 24 is a time chart illustrating the pressure differential in the expansion unit and the rotational speed of the pump expansion unit from the start to the normal control of the Rankine cycle according to the fourth embodiment.

A fourth embodiment of the present invention is shown in FIGS. 22 to 24. As compared to the above third embodiment, the waste heat recovery apparatus 1 of the fourth embodiment further has a pump temperature sensor 205 and controls the rotational speed in two steps when the generator 25 is to be operated first in the Rankine start control.

In the waste heat recovery apparatus 1 shown in FIG. 22, the pump temperature sensor (supercooled degree detector) 205 is provided on the inlet side of the pump 21 (between the condenser 24 and the pump 21), for obtaining the supercooled degree (sub-cool) of the refrigerant at the inlet of the pump 21. The detection signal of the pump temperature sensor 205 is output to the control unit 32.

As shown in FIG. 23, the Rankine start control S2b of the fourth embodiment has steps S101, S102 and S111, which is modified from step S110 of the third embodiment.

That is, in the Rankine start control S2b, the current control circuit 30 opens the bypass valve 27 at step S100 and operates the generator 25 at a first predetermined rotational speed at step S101. The first predetermined rotational speed is a rotational speed set by the inverter 31 as a controllable rotational speed on the side of a relatively high rotational speed (period P1a in FIG. 24: from the MG start until the completion of securing the refrigerant circulation amount).

Upon operating the generator 25 at the first predetermined rotational speed, the pump 21 is operated on the high rotational speed side, and thus the refrigerant circulates in the Rankine cycle 20 at a flow rate higher than that of the case of the above third embodiment.

At step S102, it is determined if the inlet-side refrigerant temperature (refrigerant supercooling degree at the inlet) TP detected by the pump temperature sensor 205 is equal to or higher than a predetermined supercooling degree TPc. If the inlet-side refrigerant temperature TP is equal to or higher than the predetermined supercooled degree TPc, the generator 25 is operated at a second predetermined rotational speed lower than the first predetermined rotational speed at step S111. Here, the predetermined supercooled degree is a supercooled degree determined in advance as a cooling temperature at which the refrigerant flowing out from the condenser 24 can be reliably transformed into the liquid phase refrigerant. Further, the second predetermined rotational speed is a rotational speed determined in advance as a rotational speed on the minimum side that can be controlled by the inverter 31 similar to the above third embodiment (period P1$b$ in FIG. 24: from the completion of securing the refrigerant circulation amount until when the bypass valve is closed). If the determination is negative at step S102, step S101 is continued.

At step S120, it is determined if the refrigerant temperature Tex at the inlet of the expansion unit detected by the expansion unit temperature sensor 206 is equal to or higher than the predetermined temperature Texc2. If the refrigerant temperature Tex is equal to or higher than the predetermined temperature Texc2, steps S130 through S160 are executed, similar to the above third embodiment. If the refrigerant temperature is lower than the predetermined temperature Texc2, step S110 is continued.

In the fourth embodiment, the predetermined rotational speed at the time when the generator 25 is first operated is the first predetermined rotational speed on the high rotational speed side. Therefore, the discharge amount of the pump 21 can be increased to circulate the refrigerant through the Rankine cycle 20 in short periods of time. As such, the time can be shortened before the bypass valve 27 is closed as compared to the above third embodiment, and the Rankine cycle 20 can be stably started.

When the supercooled degree of the refrigerant on the inlet side of the pump 21 is equal to or more than the predetermined supercooled degree, the refrigerant is in a sufficiently supercooled state. Thus, it can be confirmed that the refrigerant can be sufficiently circulated by the pump 21 without involving refrigerant of the gaseous phase. Therefore, the timing for changing the first predetermined rotational speed to the second predetermined rotational speed can be suitably determined.

Modified Example of Fourth Embodiment

Figure 25:
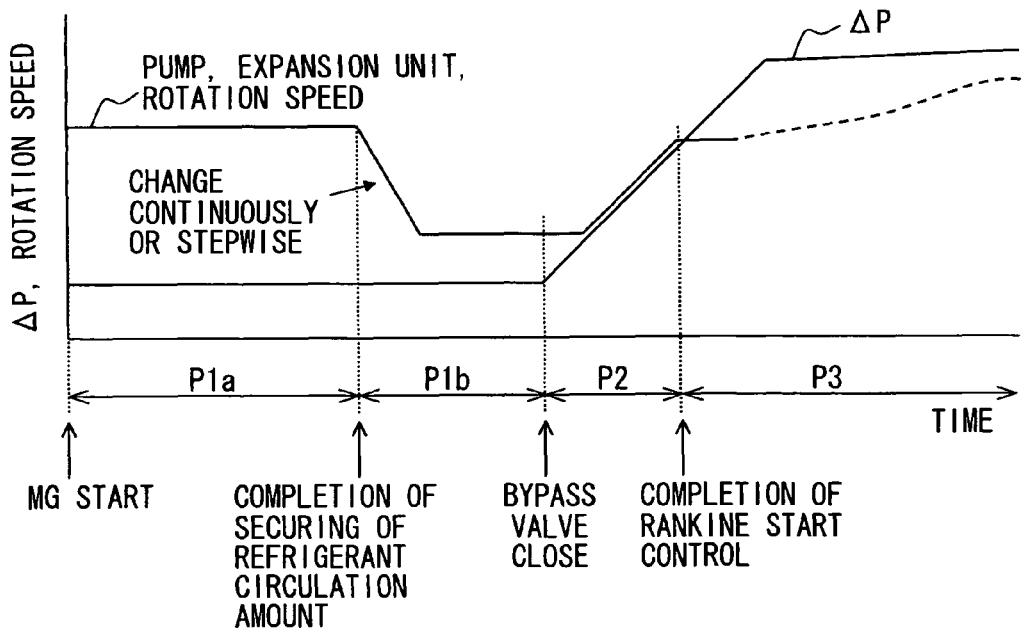
FIG. 25 is a time chart illustrating the pressure differential in the expansion unit and the rotational speed of the pump expansion unit from the start to the normal control of the Rankine cycle according to a modified example of the fourth embodiment.

In the above fourth embodiment, when the generator 25 is first operated, the rotational speed was simply changed from the first predetermined rotational speed to the second predetermined rotational speed if the supercooled degree Tp of the refrigerant was equal to or more than a predetermined supercooled degree Tpc. As shown in FIG. 25, however, the rotational speed may be continuously and monotonously decreased or may be decreased stepwise (not shown). This enables the Rankine cycle 20 to be smoothly operated without excess load.

Other Embodiments

In the above embodiments, the pressure differential in the expansion unit 23 is detected by the inlet-side pressure sensor 207 and the outlet-side pressure sensor 208. Not being limited thereto, the pressure differential in the expansion unit may be calculated from the refrigerant temperature which is related to the refrigerant pressure.

In the above embodiments, the heat-generating device that is accompanied by the waste of heat is the engine 10 (engine cooling water) for vehicles. Not being limited thereto, the present invention can be widely applied to those which generate heat at the time of operation and partly exhaust heat (waste heat) for controlling the temperature, such as external combustion engine, fuel cell stack of a fuel cell vehicle, various motors and inverters.

Further, description has been made assuming that the waste heat recovery apparatus 1 is applied to a vehicle. Not being limited thereto, however, the waste heat recovery apparatus may be applied to a stationary use.

The present invention may be implemented by suitably combining the above embodiments. For example, the Rankine start control S2$a$ or S2$b$ of FIG. 18 or 23 may be executed in the main flow shown in FIG. 2.

Additional advantages and modifications will readily occur to those skilled in the art. The invention in its broader term is therefore not limited to the specific details, representative apparatus, and illustrative examples shown and described.

What is claimed is:

1. A waste heat recovery apparatus which utilizes waste heat from a heat generating device, comprising:
   a Rankine cycle which includes a pump for circulating an operation fluid, a heater for heating the operation fluid by the waste heat, an expansion unit for converting energy of expansion of the heated operation fluid into mechanical energy, and a condenser for condensing and liquefying the expanded operation fluid;
   a temperature detector which detects a temperature of the operation fluid flowing into the expansion unit;
   an inlet-side pressure detector which detects pressure on an inlet side of the expansion unit;
   an outlet-side pressure detector which detects pressure on an outlet side of the expansion unit; and
   Rankine operation control means for controlling an command rotational speed of the expansion unit based on superheated degree information on the inlet side of the expansion unit and pressure information, the superheated degree information being obtained from the temperature of the operation fluid detected by the temperature detector and the inlet-side pressure detected by the inlet-side pressure detector, and the pressure information being obtained by considering the outlet-side pressure detected by the outlet-side pressure detector.

2. The waste heat recovery apparatus according to claim 1, wherein the Rankine operation control means includes maximum/minimum rotational speed setting means for setting a maximum rotational speed and a minimum rotational speed based on the superheated degree information and the pressure information to obtain the command rotational speed.

3. The waste heat recovery apparatus according to claim 2, wherein
   the pressure information is one of the outlet-side pressure and a pressure differential between the inlet-side pressure and the outlet-side pressure; and
   the maximum/minimum rotational speed setting means calculates a first maximum rotational speed and a first minimum rotational speed of the expansion unit based on the superheated degree information, calculates a second maximum rotational speed and a second minimum rotational speed of the expansion unit based on the pressure information, sets one of the first maximum rotational speed and the second maximum rotational speed, whichever is smaller, as the maximum rotational speed, and sets one of the first minimum rotational speed and the second minimum rotational speed, whichever is smaller, as the minimum rotational speed.

4. The waste heat recovery apparatus according to claim 2, wherein
the pressure information is a pressure ratio of the inlet-side pressure to the outlet-side pressure, and
the maximum/minimum rotational speed setting means sets the minimum rotational speed to a predetermined value, and sets the maximum rotational speed by adding thereto an increment and decrement determined in advance based on the superheated degree information of the expansion unit and the pressure ratio.

5. The waste heat recovery apparatus according to claim 4, wherein the increment and decrement are set to be large when the superheated degree information and the pressure ratio are both large, as compared to when the superheated degree information and the pressure ratio are both small.

6. The waste heat recovery apparatus according claim 2, wherein the Rankine operation control means includes command rotational speed determining means for determining the command rotational speed based on a battery voltage of a battery that stores the electric energy converted from the mechanical energy.

7. The waste heat recovery apparatus according to claim 1, wherein the Rankine operation control means includes stop-delaying means which, when the command rotational speed of the expansion unit is zero, shifts to a control for stopping the expansion unit only when the command rotational speed is still zero even after a predetermined period of time elapses.

8. The waste heat recovery apparatus according to claim 1, further comprising Rankine operation determination control means for determining whether there is an operation command that is output when the operating conditions are satisfied in an initial period of operation of the Rankine cycle.

9. The waste heat recovery apparatus according to claim 1, further comprising Rankine start control means and Rankine start determination control means for determining if the Rankine cycle is normally started before the Rankine operation control means controls the command rotational speed of the expansion unit.

10. The waste heat recovery apparatus according to claim 1, further comprising Rankine stop control means for commanding the command rotational speed of the expansion unit to be zero after the rotational speed of the expansion unit is decreased to a predetermined rotational speed.

11. The waste heat recovery apparatus according to claim 1, further comprising Rankine stop determination control means for determining if the Rankine cycle is normally stopped.

12. The waste heat recovery apparatus according to claim 1, further comprising:
a rotary electric machine which has functions of an electric motor and a generator, and is connected to the pump and to the expansion unit through the same shaft;
a bypass passage which bypasses the expansion unit;
an opening/closing part which opens and closes the bypass passage; and
Rankine start control means, wherein, at the time of starting the Rankine cycle, the Rankine start control means controls the opening/closing part to open the bypass passage and controls the rotary electric machine to operate as the electric motor at a predetermined rotational speed, if the temperature of the gaseous phase operation fluid detected by the temperature detector becomes equal to or higher than a predetermined temperature, the Rankine start control means controls the opening/closing part to close the bypass passage and controls the opening/closing part such that an operation rotational speed increases relative to the predetermined rotational speed until a pressure differential between the inlet-side pressure detected by the pressure detector and the outlet-side pressure detected by the pressure detector reaches a predetermined pressure differential.

13. The waste heat recovery apparatus according to claim 12, wherein the Rankine start control means controls the rotary electric machine such that the operation rotational speed continuously and monotonously increases relative to the predetermined rotational speed.

14. The waste heat recovery apparatus according to claim 12, wherein the Rankine start control means controls the rotary electric machine such that the operation rotational speed increases stepwise relative to the predetermined rotational speed.

15. The waste heat recovery apparatus according to claim 12, further comprising a supercooled degree detector which detects a supercooled degree of the operation fluid on an inlet side of the pump, wherein
when the rotary electric machine is to be operated as the electric motor, the Rankine start control means controls the rotary electric machine first to operate at a first predetermined rotational speed as the predetermined rotational speed, and if the supercooled degree detected by the supercooled degree detector becomes equal to or higher than a predetermined supercooled degree, the Rankine start control means controls the rotary electric machine to operate at a second predetermined rotational speed lower than the first predetermined rotational speed.

16. The waste heat recovery apparatus according to claim 15, wherein, when the rotary electric machine is to be operated at the second predetermined rotational speed, the Rankine start control means controls the rotary electric machine such that the operation rotational speed decreases from the first predetermined rotational speed to the second predetermined rotational speed in one of a continuous and monotonous manner and a stepwise manner.

17. A waste heat recovery apparatus comprising:
a Rankine cycle which includes a pump for pressure-feeding a liquid phase operation fluid, a heater for transforming the liquid phase operation fluid fed from the pump into a gaseous phase operation fluid by heating with waste heat from a heat-generating device, an expansion unit for converting energy of expansion of the gaseous phase operation fluid flowing out from the heater into mechanical energy, and a condenser for condensing and liquefying the expanded gaseous phase operation fluid flowing out from the expansion unit and introducing the liquefied operation fluid into the pump;
a rotary electric machine which has both functions of an electric motor and a generator, and is connected to the pump and the expansion unit through the same shaft;
a control unit which controls the operation of the rotary electric machine;
a bypass passage which bypasses the expansion unit;
an opening/closing part which is controlled by the control unit to open and close the bypass passage;
a temperature detector which detects the temperature of the gaseous phase operation fluid on an inlet side of the expansion unit; and
pressure differential detecting means for detecting a pressure differential between an inlet and an outlet of the expansion unit;
wherein, at the start of the Rankine cycle, the control unit controls the opening/closing part to open the bypass passage and controls the rotary electric machine to operate as the electric motor at a predetermined rotational speed, and if the temperature of the gaseous phase operation fluid detected by the temperature detector becomes equal to or higher than a predetermined temperature, the control unit controls the opening/closing part to close the bypass passage, and controls the rotary electric machine such that an operation rotational speed of the rotary electric machine increases relative to the predetermined rotational speed until a pressure differential detected by the pressure differential detector means reaches a predetermined pressure differential.

18. The waste heat recovery apparatus according to claim 17, wherein the control unit continuously and monotonously increases the operation rotational speed of the rotary electric machine relative to the predetermined rotational speed.

19. The waste heat recovery apparatus according to claim 17, wherein the control unit increases the operation rotational speed of the rotary electric machine stepwise relative to the predetermined rotational speed.

20. The waste heat recovery apparatus according to claim 17, further comprising a supercooled degree detector which detects the supercooled degree of the operation fluid on the inlet side of the pump, wherein, when the rotary electric machine is to be operated as the electric motor, the control unit controls the rotary electric machine first to operate at a first predetermined rotational speed as the predetermined rotational speed, and if the supercooled degree detected by the supercooled degree detector becomes equal to or higher than a predetermined supercooled degree, the control unit controls the rotary electric machine to operate at a second predetermined rotational speed lower than the first predetermined rotational speed.

21. The waste heat recovery apparatus according to claim 20, wherein, when the rotary electric machine is to be operated at the second predetermined rotational speed, the control unit controls the rotary electric machine such that the operation rotational speed decreases from the first predetermined rotational speed to the second predetermined rotational speed in one of a continuous and monotonous manner and a stepwise manner.

* * * * *